(12) United States Patent
Ma et al.

(10) Patent No.: US 12,132,793 B2
(45) Date of Patent: Oct. 29, 2024

(54) CROSS-DEVICE ALLOCATION METHOD FOR SERVICE ELEMENT, TERMINAL DEVICE, AND STORAGE MEDIUM

(71) Applicant: Huawei Technologies Co., Ltd., Shenzhen (CN)

(72) Inventors: Xiaohui Ma, Nanjing (CN); Chundong Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 6 days.

(21) Appl. No.: 17/802,014

(22) PCT Filed: Oct. 30, 2020

(86) PCT No.: PCT/CN2020/125589
§ 371 (c)(1),
(2) Date: Aug. 24, 2022

(87) PCT Pub. No.: WO2021/169370
PCT Pub. Date: Sep. 2, 2021

(65) Prior Publication Data
US 2023/0105934 A1 Apr. 6, 2023

(30) Foreign Application Priority Data
Feb. 26, 2020 (CN) .......................... 202010123363.X

(51) Int. Cl.
*H04L 67/51* (2022.01)
*H04L 67/52* (2022.01)

(52) U.S. Cl.
CPC .............. *H04L 67/51* (2022.05); *H04L 67/52* (2022.05)

(58) Field of Classification Search
CPC ......... H04L 67/51; H04L 67/52; H04L 67/12; H04L 67/01
See application file for complete search history.

(56) References Cited

U.S. PATENT DOCUMENTS

| 2004/0023666 A1* | 2/2004 | Moon ................ G06F 16/9537 455/427 |
| 2009/0009340 A1* | 1/2009 | Weaver ................ G01D 21/00 340/573.1 |

(Continued)

FOREIGN PATENT DOCUMENTS

| CN | 104156064 A | 11/2014 |
| CN | 106550190 A | 3/2017 |

(Continued)

OTHER PUBLICATIONS

Park et al, "AdaM: Adapting Multi-User Interfaces for Collaborative Environments in Real-Time", CHI 2018, Apr. 21-26, 2018, Montréal, QC, Canada, 14 pages (Year: 2018).*

(Continued)

*Primary Examiner* — Thu V Nguyen
*Assistant Examiner* — Ranjan Pant
(74) *Attorney, Agent, or Firm* — Conley Rose, P.C.

(57) ABSTRACT

A cross-device allocation method for a service element includes obtaining a to-be-allocated service element from a source device; determining a preset matching relationship between each to-be-allocated service element and each target allocation device, where the preset matching relationship describes a probability value that each service element is allocated to each target allocation device; obtaining a distance relationship between each target allocation device and the source device; determining a correspondence between each service element and each target allocation device according to the preset matching relationship and the distance relationship; and allocating, according to the correspondence, each service element to the target allocation device corresponding to the service element.

15 Claims, 9 Drawing Sheets

(56) References Cited

U.S. PATENT DOCUMENTS

| | | | |
|---|---|---|---|
| 2011/0306349 A1 | 12/2011 | Hakola et al. | |
| 2016/0286165 A1 | 9/2016 | Sorokin et al. | |
| 2017/0060518 A1 | 3/2017 | Hong et al. | |
| 2017/0118576 A1* | 4/2017 | Sharifi | G06F 16/24578 |
| 2018/0097762 A1* | 4/2018 | Garcia | G06Q 30/0207 |
| 2018/0176311 A1* | 6/2018 | Sharma | H04L 67/535 |
| 2018/0324121 A1* | 11/2018 | Zhang | H04L 51/046 |
| 2019/0079704 A1* | 3/2019 | Tokuchi | G06F 3/1204 |
| 2020/0193357 A1* | 6/2020 | Sun | G06Q 30/02 |

FOREIGN PATENT DOCUMENTS

| | | |
|---|---|---|
| CN | 108769387 A | 11/2018 |
| CN | 108966067 A | 12/2018 |
| CN | 110121007 A | 8/2019 |
| CN | 110366036 A | 10/2019 |
| CN | 111431968 A | 7/2020 |

OTHER PUBLICATIONS

Park, S., et al., "AdaM: Adapting Multi-User Interfaces for Collaborative Environments in Real-Time," In Proceedings of the 2018 CHI Conference on Human Factors in Computing Systems (CHI '18), Association for Computing Machinery, New York, NY, USA, Paper 184, 14 pages.

* cited by examiner

CROSS-DEVICE ALLOCATION METHOD FOR SERVICE ELEMENT, TERMINAL DEVICE, AND STORAGE MEDIUM

CROSS-REFERENCE TO RELATED APPLICATIONS

This is a U.S. National Stage of International Patent Application No. PCT/CN2020/125589 filed on Oct. 30, 2020, which claims priority to Chinese Patent Application Ser. No. 20/2010123363.X filed on Feb. 26, 2020. Both of the aforementioned applications are hereby incorporated by reference in their entireties.

TECHNICAL FIELD

This application relates to the field of terminal technologies, and in particular, to a cross-device allocation method for a service element, a terminal device, and a storage medium.

BACKGROUND

With rapid development of terminal devices, people use increasingly more types of terminal devices in daily lives. When a network in which a primary device frequently used by a user is located includes a plurality of different types of terminal devices, to allow the user to operate or view, a service element currently being executed or displayed on the primary device of the user may be allocated to another terminal device for executing or displaying. For example, when a mobile phone of the user is playing music, to allow the user to view in an easier manner, lyrics on a music playing screen may be simultaneously displayed on a television. To allow the user to operate, an operation control on the music playing screen may be simultaneously displayed on a smartwatch worn by the user.

When the service element on the primary device is allocated to the another terminal device located in a same network as the primary device, in a conventional technology, some service elements are always allocated to some terminal devices according to a preset service element allocation policy. Regardless of how an actual scenario of the user changes, the service elements allocated to the terminal devices remain unchanged. It can be learned that, in the existing cross-device allocation method for the service element, the service element allocation policy cannot be adjusted based on the actual scenario of the user. This is less intelligence.

SUMMARY

This application provides a cross-device allocation method for a service element, a terminal device, and a storage medium, to resolve a problem that a service element allocation policy cannot be adjusted in an existing cross-device allocation method for a service element based on an actual scenario of a user, which is less intelligence.

To achieve the foregoing objective, the following technical solutions are used in this application.

According to a first aspect, this application provides a cross-device allocation method for a service element, including:

obtaining a to-be-allocated service element from the source device, and determining a preset matching relationship between each to-be-allocated service element and each target allocation device, where the preset matching relationship describes a probability value that each service element is allocated to each target allocation device;

obtaining a distance relationship between each target allocation device and the source device; and determining a correspondence between each service element and each target allocation device according to the preset matching relationship and the distance relationship, and allocating, according to the correspondence, each service element to the target allocation device corresponding to the service element.

In this embodiment, the correspondence between each service element and each target allocation device is determined according to the preset matching relationship between each to-be-allocated service element and each target allocation device and the distance relationship between each target allocation device and the source device, and each service element is allocated, according to the correspondence, to the target allocation device corresponding to the service element. In this way, when a location of the source device changes, the distance relationship between each target allocation device and the source device also changes, and the correspondence determined according to the preset matching relationship and the distance relationship also changes, so that the service element allocated to each target allocation device also correspondingly changes. Compared with the conventional technology, in the cross-device allocation method for the service element provided in this embodiment, a service element allocation policy can be adjusted based on the change in the distance between the source device and each target allocation device, so that intelligence of cross-device allocation of the service element can be improved.

In a possible implementation of the first aspect, the determining a preset matching relationship between each to-be-allocated service element and each target allocation device includes:

obtaining a first matching relationship, corresponding to a target user type of a target user, between each service element and each target allocation device; and/or obtaining a second matching relationship, determined based on a specified allocation operation performed by the target user on the service element, between each service element and each target allocation device, where the target user is a user currently using the source device.

In a possible implementation of the first aspect, the obtaining a first matching relationship, corresponding to a target user type of a target user, between each service element and each target allocation device includes:

obtaining a score value, corresponding to the target user type, of each service element relative to each preset element attribute;

obtaining a score value, corresponding to the target user type, of each target allocation device relative to each preset device attribute; and obtaining the first matching relationship based on the score value of each service element relative to each preset element attribute and the score value of each target allocation device relative to each preset device attribute.

In a possible implementation of the first aspect, the determining a correspondence between each service element and each target allocation device according to the preset matching relationship and the distance relationship includes:

determining the correspondence between each service element and each target allocation device according to the first matching relationship, the second matching relationship, and the distance relationship by using a preset linear programming equation, where the preset linear programming equation is:

$$\text{Max} \Sigma_{i,j=1}^{q,m} w_1 UX + w_2 PX + w_3 DX, \ n_i = \Sigma_{k=1}^{m} x_{i,k}; \text{ where}$$

$w_1$ is a preset weight of the first matching relationship, $w_2$ is a preset weight of the second matching relationship, $w_3$ is a preset weight of the distance relationship, $w_1+w_2+w_3=1$, and $w_3 \neq 0$; q is a quantity of to-be-allocated service elements; and m is a quantity of target allocation devices; U is the first matching relationship, $U=\{u_{i,j}\}$, $u_{i,j}$ is a first probability value that an $i^{th}$ service element is allocated to a $j^{th}$ target allocation device, i=1, 2, . . . , and q, and j=1, 2, . . . , and m; P is the second matching relationship, $P=\{p_{i,j}\}$, and $p_{i,j}$ is a second probability value that the $i^{th}$ service element is allocated to the $j^{th}$ target allocation device; D is the distance relationship, $D=\{d_j\}$, and $d_j$ is a distance value between the $j^{th}$ target allocation device and the source device; X is the correspondence, $X=\{x_{i,j}\}$, $x_{i,j}$ indicates whether the service element needs to be allocated to the $j^{th}$ target allocation device, a value of $x_{i,j}$ is 1 or 0, when the value of $x_{i,j}$ is 1, it indicates that the $i^{th}$ service element needs to be allocated to the $j^{th}$ target allocation device, and when the value of $x_{i,j}$ is 0, it indicates that the $i^{th}$ service element does not need to be allocated to the $j^{th}$ target allocation device; and $n_i$ is quantity of target allocation devices to which the $i^{th}$ service element can be allocated.

In a possible implementation of the first aspect, before the obtaining a to-be-allocated service element from the source device, and determining a preset matching relationship between each to-be-allocated service element and each target allocation device, the method further includes:
   obtaining a distance value between each candidate device and the source device, where the candidate device is a terminal device located in a same network as the source device; and
   determining a candidate device whose distance value between the candidate device and the source device is less than or equal to a preset distance threshold as the target allocation device.

In this implementation, the source device determines only a terminal device that is close to the source device as the target allocation device. In other words, the source device subsequently allocates the service element only to the terminal device that is close to the source device, and does not allocate the service element to a terminal device that is far from the source device. Therefore, a user privacy leakage risk can be reduced.

In a possible implementation of the first aspect, the target allocation device does not include a preset wearable device; and correspondingly, after the allocating, according to the correspondence, each service element to the target allocation device corresponding to the service element, the method further includes:
   obtaining motion data of the source device in real time;
   if it is detected, based on the motion data, that a location of the source device changes, re-obtaining the distance relationship between each target allocation device and the source device; and
   re-determining the correspondence according to the preset matching relationship and the re-obtained distance relationship, and allocating, according to the re-determined correspondence, each service element to the target allocation device corresponding to the service element.

In this embodiment, when detecting that the current location of the source device changes, the source device considers that a current location of the target user changes. In this case, the source device re-obtains the current distance relationship between the source device and each target allocation device, and adjusts, according to the re-obtained distance relationship, the service element allocated to each target allocation device, so that a cross-device allocation result of the service element is more suitable for an actual scenario of the user, and intelligence of cross-device allocation of the service element can be improved.

In a possible implementation of the first aspect, the target allocation device includes a preset wearable device; and correspondingly, after the allocating, according to the correspondence, each service element to the target allocation device corresponding to the service element, the method further includes:
   obtaining motion data of the source device in real time, and obtaining motion data of the preset wearable device in real time;
   if it is detected, based on the motion data of the preset wearable device, that a location of the preset wearable device changes, and it is detected that a user currently using the preset wearable device is a target user, re-obtaining a distance relationship between each target allocation device and the preset wearable device; and
   re-determining the correspondence according to the preset matching relationship and the re-obtained distance relationship, and allocating, according to the re-determined correspondence, each service element to the target allocation device corresponding to the service element.

In this embodiment, change in the location of the target user is determined by considering both the change in the location of the source device or the change in the location of the preset wearable device, so that accuracy of identifying the change in the location of the target user can be improved. In addition, when detecting that the location of the target user changes, the source device re-obtains the distance relationship between the current location of the target user and each target allocation device, and adjusts, according to the re-obtained distance relationship, the service element allocated to each target allocation device, so that a cross-device allocation result of the service element is more suitable for an actual scenario of the user, and intelligence of cross-device allocation of the service element can be improved.

In a possible implementation of the first aspect, after the allocating, according to the correspondence, each service element to the target allocation device corresponding to the service element, the method further includes:
   allocating, in response to an allocation result adjustment instruction input by the target user, a service element indicated by the allocation result adjustment instruction to a target allocation device indicated by the allocation result adjustment instruction; and
   updating the second matching relationship in response to the allocation result adjustment instruction.

In this embodiment, since the source device may adjust an allocation result of the service element according to the allocation result adjustment instruction input by the target user, the current allocation result of the service element can better meet a personalized requirement of the target user. In addition, since the source device further updates the second matching relationship according to the allocation result adjustment instruction, an allocation result obtained when the source device performs cross-device allocation on the service element next time according to the second matching relationship better meets a personalized requirement of the target user.

According to a second aspect, this application provides a terminal device, including:
- a first obtaining unit, configured to obtain a to-be-allocated service element from the source device, and determine a preset matching relationship between each to-be-allocated service element and each target allocation device, where the preset matching relationship describes a probability value that each service element is allocated to each target allocation device;
- a second obtaining unit, configured to obtain a distance relationship between each target allocation device and the source device; and
- an element allocation unit, configured to determine a correspondence between each service element and each target allocation device according to the preset matching relationship and the distance relationship, and allocate, according to the correspondence, each service element to the target allocation device corresponding to the service element.

According to a third aspect, this application provides a terminal device, including a memory, a processor, and a computer program that is stored in the memory and runs on the processor, where when executing the computer program, the processor implements the cross-device allocation method for the service element according to the first aspect.

According to a fourth aspect, this application provides a computer-readable storage medium, where the computer-readable storage medium stores a computer program, and when the computer program is executed by a processor, the cross-device allocation method for the service element according to the first aspect is implemented.

According to a fifth aspect, this application provides a computer program product, where when the computer program product runs on a terminal device, the terminal device is enabled to perform the cross-device allocation method for the service element according to the first aspect.

It may be understood that, for beneficial effects of the second aspect to the fifth aspect, refer to related descriptions in the first aspect. Details are not described herein again.

DESCRIPTION OF EMBODIMENTS

In the following description, for illustration instead of limitation, specific details such as a particular system structure and a technology are provided to make a thorough understanding of the embodiments of this application. However, persons skilled in the art should know that this application can also be implemented in other embodiments without these specific details. In other cases, detailed descriptions of well-known systems, apparatuses, circuits, and methods are omitted, so that this application is described without being obscured by unnecessary details.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Similarly, according to the context, the phrase "if it is determined that" or "if (a described condition or event) is detected" may be interpreted as a meaning of "once it is determined that" or "in response to determining" or "once (a described condition or event) is detected" or "in response to detecting (a described condition or event)".

In addition, in the specification and the appended claims of this application, the terms "first", "second", "third", and the like are merely used for distinguishing description, and shall not be understood as an indication or implication of relative importance.

Reference to "an embodiment", "some embodiments", or the like described in the specification of this application indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment, instead, the statements mean referring to "one or more but not all of the embodiments", unless otherwise specifically emphasized in other ways. Terms "include", "contain", "have", and variants of the terms all mean "include but are not limited to", unless otherwise specifically emphasized in other ways.

Figure 1:
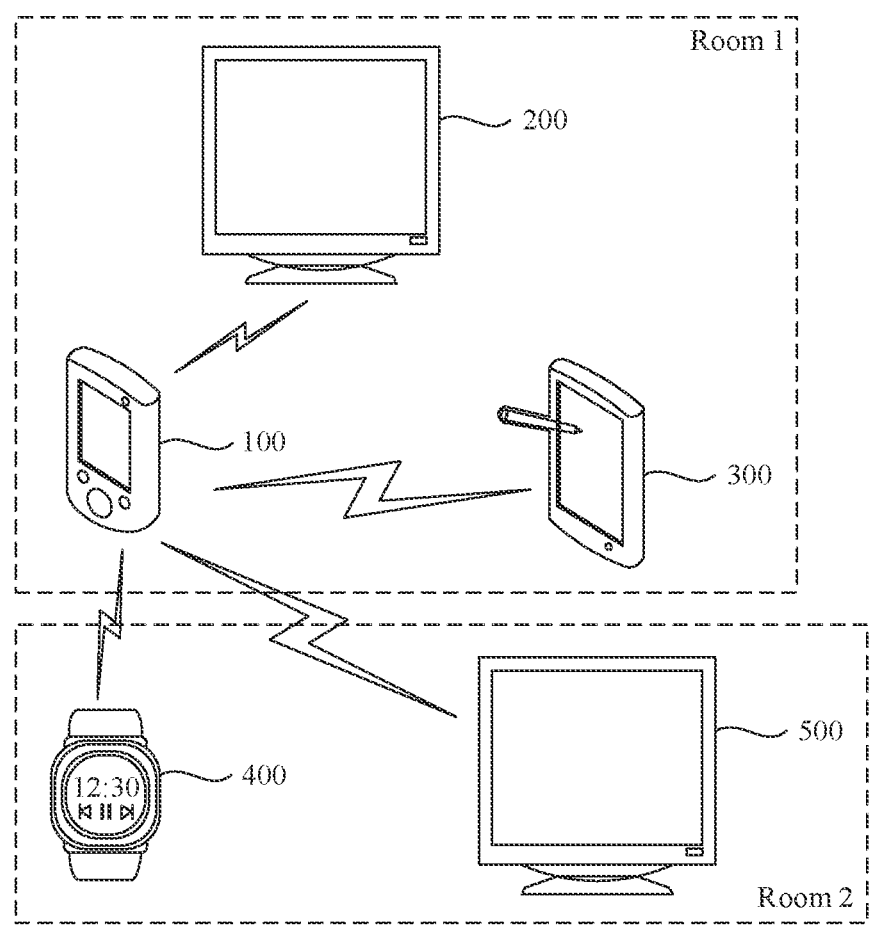
FIG. 1 is a schematic diagram of a structure of a network architecture formed by networked terminal devices according to an embodiment of this application.

FIG. 1 is a schematic diagram of a structure of a network architecture formed by networked terminal devices according to an embodiment of this application. As shown in FIG. 1, the network architecture may be formed by networking of at least two terminal devices of a user. A networking manner of the at least two terminal devices may be set based on actual requirements. The networking manner of the at least two terminal devices is not specially limited in this embodiment of this application. By way of example, but not limitation, in a specific implementation, the network architecture ma be formed by the at least two terminal devices through networking based on a wireless networking technology, and a network formed through networking based on the wireless networking technology is a wireless network. In other words, in this implementation, the at least two terminals are located in a same wireless network, and may perform wireless communication. In actual application, the wireless networking technology may include but is not limited to a local area network networking technology, a Bluetooth networking technology, a ZigBee networking technology, and the like.

In this embodiment of this application, at least one of the at least two terminal devices may be defined as a source device of the user. The source device refers to a terminal device that can perform or needs to perform service element allocation. In other words, when implementing a service, the source device may allocate a service element included in the service to another terminal device located in a same network as the source device if required in a scenario, so that the another terminal device executes or displays the service element allocated to the another terminal device.

In actual application, the source device may be defined by the user. For example, the user may define a mobile device that is frequently used by the user and that can move with the user as the source device. For example, the user may define a mobile phone that is frequently used by the user and that can be carried with the user most of the time as the source device. It may be understood that since the source device is usually carried by the user, a location of the user may be represented by using a location of the source device in this embodiment of this application.

In this embodiment of this application, the service element may be a service element included in any service that can be implemented by the source device. The service that can be implemented by the source device includes but is not limited to a system service of the source device, a service provided by any application (application, APP) installed on the source device, or the like. A type of the service element may include but is not limited to a task element and an interface element. The task element included in the service refers to a task that needs to be executed by the terminal device when the service is implemented on the terminal device. The interface element included in the service refers to an element that needs to be displayed in an interaction interface of the terminal device when the service is implemented on the terminal device. For example, for a music playing service, a task element included in the service may be a music playing task, and an interface element included in the service may include but is not limited to a music playing screen and elements such as a song cover, a song name, lyrics, and an operation control that need to be displayed on the music playing screen. The operation control may include but is not limited to a player control, a pause control, a skip song control, a download control, and a favorite control.

In actual application, terminal devices may be classified, based on different types of terminal devices, into a mobile phone, a computer, a television, a tablet computer, a wearable device, an in-vehicle device, and an augmented reality (augmented reality, AR)/virtual reality (virtual reality, VR) device, a super mobile personal computer (ultra-mobile personal computer, UMPC), a netbook, a personal digital assistant (personal digital assistant, PDA), and the like.

In this embodiment of this application, the at least two terminal devices included in the network architecture may be terminal devices of a same type, or may be terminal devices of different types. There may be at least one terminal device of each type included in the network architecture. A specific quantity of terminal devices of each type is not specially limited in this embodiment of this application. FIG. 1 shows an example in which the network architecture includes a mobile phone 100 of the user, a first television 200, a tablet computer 300, a wearable device 400, and a second television 500 for description. The mobile phone 100 may be used as a source device of the user. In an actual scenario, terminal devices included in the network architecture may be located at different locations at different moments. FIG. 1 shows an example in which the mobile phone 100, the first television 200, and the tablet computer 300 are located in a room 1, and the wearable device 400 and the second television 500 are located in a room 2 at a moment. Certainly, at another moment, the mobile phone 100 may move to another location as the user moves, and mobile terminals such as the tablet computer 300 and the wearable device 400 may also be moved to another location by the user.

By way of example, and not limitation, when the network architecture includes a wearable device, the wearable device may alternatively be a generic term for wearable devices developed by applying wearable technologies to intelligent designs of daily wear, for example, glasses, gloves, watches, clothes, and shoes. The wearable device is a portable device that can be directly worn on the body or integrated into clothes or an accessory of a user. The wearable device is more than a hardware device. The wearable device implements powerful functions through software support, data exchange, and cloud interaction. Generally, the wearable intelligent device includes a device with full-function and large-size that implements complete or some functions without depending on a smartphone, for example, a smartwatch or smart glasses, and a device that focuses on only one type of application functions and needs to be cooperated with another device such as a smartphone, for example, various smart bands and smart jewelry.

Figure 2:
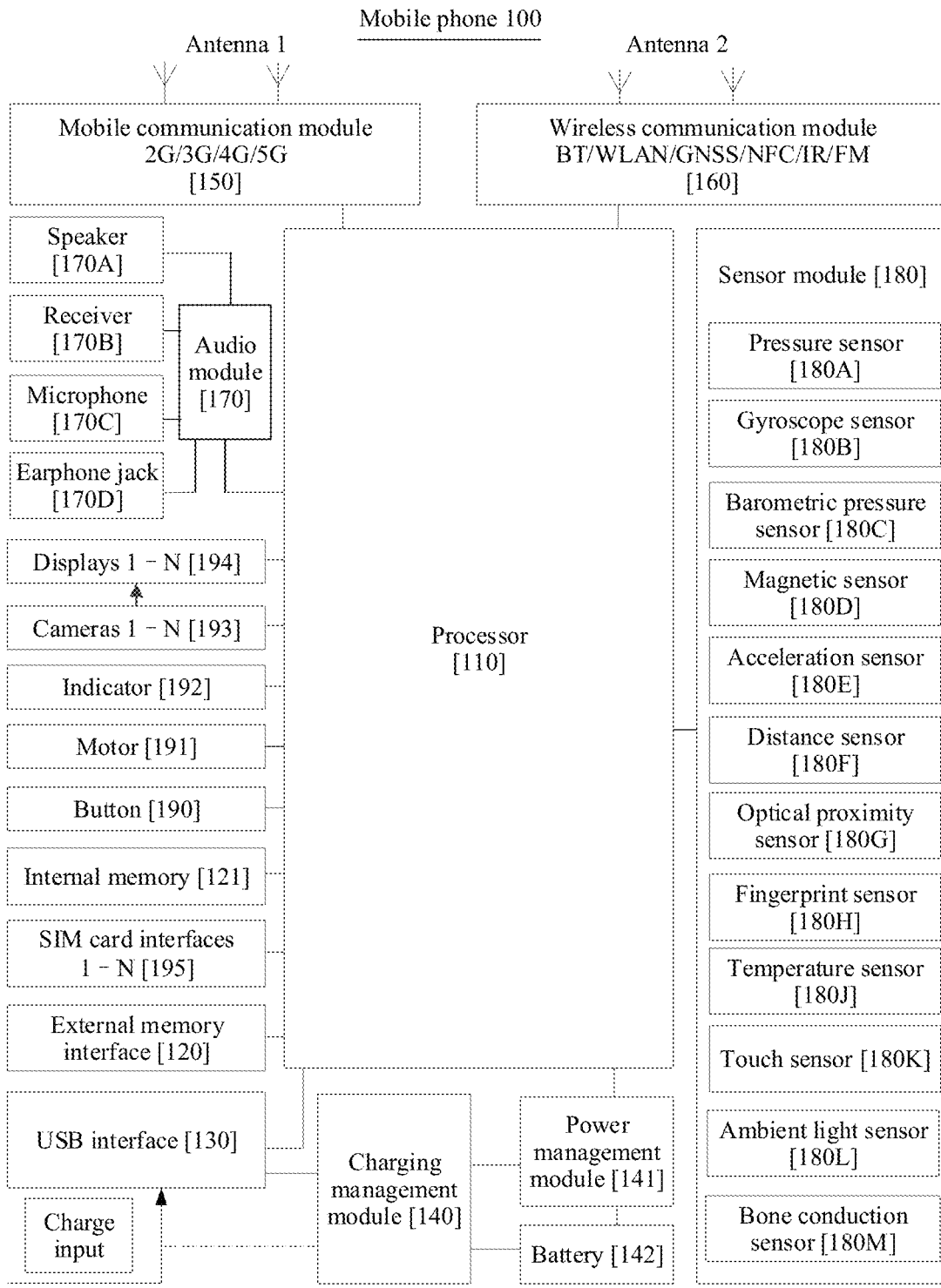
FIG. 2 is a schematic diagram of a structure of hardware of a mobile phone to which a cross-device allocation method for a service element is applicable according to an embodiment of this application.

For example, the source device is a mobile phone. FIG. 2 is a schematic diagram of a structure of hardware of a mobile phone to which a cross-device allocation method for a service element is applicable according to an embodiment of this application. As shown in FIG. 2, the mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the mobile phone 100. In other embodiments of this application, the mobile phone 100 may include more or fewer components than those shown in the figure, or combine some components, or split some components, or have a different component arrangement. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on instruction operation code and a time sequence signal, to complete control of instruction reading and instruction execution.

A memory may further be disposed in the processor 110, and is configured to store instructions and data. In some embodiments, the memory in the processor 110 is a cache. The memory may store an instruction or data that has been used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the mobile phone 100. The processor 110 communicates with the display 194 through the DSI interface, to implement a display function of the mobile phone 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that complies with a USB standard specification, and may be specifically a mini USB interface, a micro USB interface, a USB Type C interface, or the like. The USB interface 130 may be configured to connect to a charger to charge the mobile phone 100, or may be configured to transmit data between the mobile phone 100 and a peripheral device, or may be configured to connect to a headset, to play audio by using the headset. The interface may further be configured to connect to another electronic device such as an AR device.

It may be understood that an interface connection relationship between the modules shown in this embodiment of this application is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the mobile phone 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may further be configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the mobile phone 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone 100 may be configured to cover one or more communication frequency bands. Different antennas may further be multiplexed, to improve antenna utilization. For example, the antenna 1 may be multiplexed as a diversity antenna of a wireless local area network. In some other embodiments, an antenna may be used in combination with a tuning switch.

The mobile communication module 150 may provide a solution to wireless communication that includes 2G/3G/4G/5G or the like and that is applied to the mobile phone 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some function modules in the mobile communication module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another function module.

The wireless communication module 160 may provide a solution to wireless communication that is applied to the mobile phone 100 and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communication module 150 of the mobile phone 100 are coupled, and the antenna 2 and the wireless communication module 160 of the mobile phone 100 are coupled, so that the mobile phone 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or satellite based augmentation systems (satellite based augmentation systems, SBAS).

The mobile phone 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute an instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the mobile phone 100 may include one or N displays 194. Herein, N is a positive integer greater than 1.

The mobile phone 100 may implement a photographing function by using the ISP, the camera 193, the video codec, the GPU, the display 194, the application processor, and the like.

The ISP may be configured to process the image data collected by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the mobile phone 100 may include one or N cameras 193, where N is a positive integer greater than 1.

The digital signal processor is configured to process a digital signal, and may process another digital signal in addition to the digital image signal. For example, when the mobile phone 100 selects a frequency, the digital signal processor is configured to perform Fourier transform on frequency energy, and the like.

The video codec is configured to compress or decompress a digital video. The mobile phone 100 may support one or more video codecs. In this way, the mobile phone 100 may play or record videos in a plurality of encoding formats, for example, moving picture experts group (moving picture experts group, MPEG)1, MPEG-2, MPEG3, and MPEG4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the mobile phone 100 may be implemented by using the NPU, for example, image recognition, facial recognition, speech recognition, and text understanding.

The external memory interface 120 may be configured to connect to an external storage card, for example, a Micro SD card, to extend a storage capability of the mobile phone 100. The external memory card communicates with the processor 110 through the external memory interface 120, to implement a data storage function. For example, data such as music, a photo, and a video is stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like created during use of the mobile phone 100. In addition, the internal memory 121 may include a high-speed random access memory, and may further include a nonvolatile memory, for example, at least one magnetic disk storage device, a flash memory device, or a universal flash storage (universal flash storage, UFS). The processor 110 executes various functional applications of the mobile phone 100 and data processing of the mobile phone 100 by running the instructions stored in the internal memory 121 and/or instructions stored in the memory that is disposed in the processor.

The mobile phone 100 may implement an audio function by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal for output, and is also configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The mobile phone 100 may listen to music or answer a hands-free call through the speaker 170A.

The receiver 170B, also referred to as an "earpiece", is configured to convert an audio electrical signal into a sound signal. When a call is answered or voice information is received by using the mobile phone 100, the receiver 170B may be put close to a human ear to listen to a voice.

The microphone 170C, also referred to as "mike" or "mic", is configured to convert a sound signal into an electrical signal. When making a call or sending a voice message, the user may make a sound near the microphone 170C through the mouth, to enter a sound signal to the microphone 170C. At least one microphone 170C may be disposed in the mobile phone 100. In some other embodiments, two microphones 170C may be disposed in the mobile phone 100, to collect a sound signal and further implement a noise reduction function. In some other embodiments, three, four, or more microphones 170C may alternatively be disposed in the mobile phone 100, to collect a sound signal, reduce noise, further identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor.

The capacitive pressure sensor may include at least two parallel plates made of conductive materials. When a force is applied to the pressure sensor 180A, capacitance between electrodes changes. The mobile phone 100 determines pressure intensity based on a capacitance change. When a touch operation is performed on the display 194, the mobile phone 100 detects intensity of the touch operation by using the pressure sensor 180A. The mobile phone 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a motion posture of the mobile phone 100. In some embodiments, the gyroscope sensor 180B may be used to determine angular velocities of the mobile phone 100 around three axes (namely, x, y, and z axes). The gyroscope sensor 180B may be configured to implement image stabilization during shooting. For example, when a shutter is pressed, the gyroscope sensor 180B detects an angle at which the mobile phone 100 jitters, obtains, through calculation based on the angle, a distance for which a lens module needs to compensate, and allows a lens to cancel the jitter of the mobile phone 100 through reverse motion, to implement image stabilization. The gyroscope sensor 180B may also be used in a navigation scenario and a somatic game scenario.

The barometric pressure sensor 180C is configured to measure barometric pressure. In some embodiments, the mobile phone 100 calculates an altitude based on a value of the atmospheric pressure measured by the barometric pressure sensor 180C, to assist positioning and navigation.

The magnetic sensor 180D includes a Hall sensor. The mobile phone 100 may detect opening and closing of a flip leather cover by using the magnetic sensor 180D. In some embodiments, when the mobile phone 100 is a clamshell phone, the mobile phone 100 may detect opening and closing of a clamshell by using the magnetic sensor 180D. Further, features such as automatic unlocking of the clamshell are set based on the detected opening and closing state of the flip leather cover or the detected opening and closing state of the clamshell.

The acceleration sensor 180E may detect a magnitude of acceleration of the mobile phone 100 in various directions (usually on three axes). When the mobile phone 100 is static, a value and a direction of gravity may be detected. The acceleration sensor 180E may further be configured to identify a posture of the electronic device, and is used in an application such as switching between a landscape mode and a portrait mode or a pedometer.

The distance sensor 180F is configured to measure a distance. The mobile phone 100 may measure a distance through infrared or laser. In some embodiments, in a photographing scenario, the mobile phone 100 may measure a distance by using the distance sensor 180F, to implement quick focusing.

The optical proximity sensor 180G may include, for example, a light-emitting diode (LED) and an optical detector such as a photodiode. The light emitting diode may be an infrared light emitting diode. The mobile phone 100 may emit infrared light by using the light emitting diode. The mobile phone 100 detects reflected infrared light of a nearby object by using the photodiode. When sufficient reflected light is detected, it may be determined that there is an object near the mobile phone 100. When insufficient reflected light is detected, the mobile phone 100 may determine that there is no object near the mobile phone 100. The mobile phone 100 may detect, by using the optical proximity sensor 180G, that the user puts the mobile phone 100 close to an ear for conversation, so that automatic screen-off is implemented to save power. The optical proximity sensor 180G may also be used in a cover mode or a pocket mode to automatically perform screen unlocking or locking.

The ambient light sensor 180L is configured to sense ambient light brightness. The mobile phone 100 may adaptively adjust luminance of the display 194 based on the sensed luminance of the ambient light. The ambient light sensor 180L may also be configured to automatically adjust white balance during photographing. The ambient light sensor 180L may further cooperate with the optical proximity sensor 180G to detect whether the mobile phone 100 is in a pocket, thereby preventing an accidental touch.

The fingerprint sensor 180H is configured to collect a fingerprint. The mobile phone 100 may implement fingerprint unlock, application lock access, fingerprint photographing, fingerprint-based call answering, and the like by using a feature of the collected fingerprint.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 reduces performance of a processor near the temperature sensor 180J, to reduce power consumption and implement heat protection. In some other embodiments, when the temperature is lower than another threshold, the mobile phone 100 heats the battery 142, to avoid an abnormal shutdown of the mobile phone 100 caused by the low temperature. In some other embodiments, when the temperature is lower than still another threshold, the mobile phone 100 boosts an output voltage of the battery 142, to avoid an abnormal shutdown caused by the low temperature.

The touch sensor 180K is also referred to as a "touch component". The touch sensor 180K may be disposed on the display 194, and the touch sensor 180K and the display 194 constitute a touchscreen. The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the mobile phone 100, and is located on a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The mobile phone 100 may receive a button input, and generate a button signal input related to a user setting and function control of the mobile phone 100.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. Touch vibration feedback effect may further be user-defined.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the mobile phone 100. The mobile phone 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with the external storage card. The mobile phone 100 interacts with a network by using the SIM card, to implement functions such as calling and data communication. In some embodiments, the mobile phone 100 uses an eSIM, namely, an embedded SIM card. The eSIM card may be embedded in the mobile phone 100, and cannot be separated from the mobile phone 100.

A software system of the mobile phone 100 may use a layered architecture, an event-driven architecture, a microkernel architecture, a microservice-based architecture, or a cloud architecture. In this embodiment of this application, an Android system with a layered architecture is used as an example to describe a software structure of the mobile phone 100.

Figure 3:
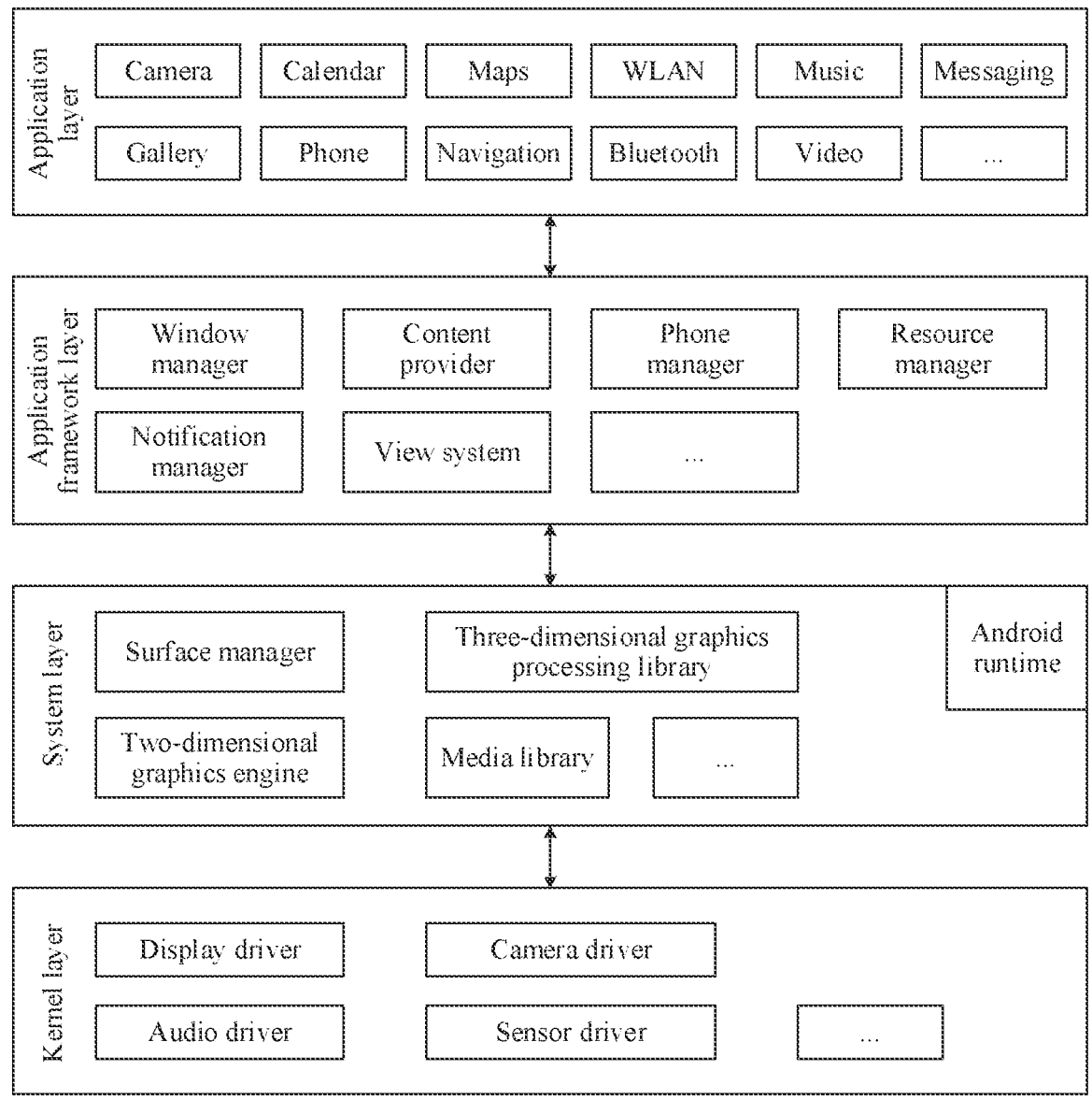
FIG. 3 is a block diagram of a software structure of a mobile phone according to an embodiment of this application.

FIG. 3 is a block diagram of a software structure of a mobile phone according to an embodiment of this application.

As shown in FIG. 3, a layered architecture divides software into several layers, each with a clear role and division of labor. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3, the application packages may include applications such as camera, gallery, calendar, phone, maps, navigation, WLAN, Bluetooth, music, videos, and messaging.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, lock a screen, take a screenshot, and the like.

The content provider is configured to store and obtain data, and enable the data to be accessed by an application. The data may include a video, an image, an audio, calls that are made and answered, a browsing history and bookmarks, an address book, and the like.

The view system includes visual controls such as a control for displaying text and a control for displaying a picture. The view system may be configured to construct an application. A display interface may include one or more views. For example, a display interface including an SMS message notification icon may include a text display view and a picture display view.

The phone manager is configured to provide a communication function of the mobile phone 100, for example, call status management (including connection and disconnection).

The resource manager provides various resources such as a localized character string, an icon, an image, a layout file, and a video file for an application.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, a prompt sound is provided, the mobile phone vibrates, or an indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes Java files at the application layer and the application framework layer as binary files. The virtual machine is configured to perform functions such as object life cycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video encoding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 4:
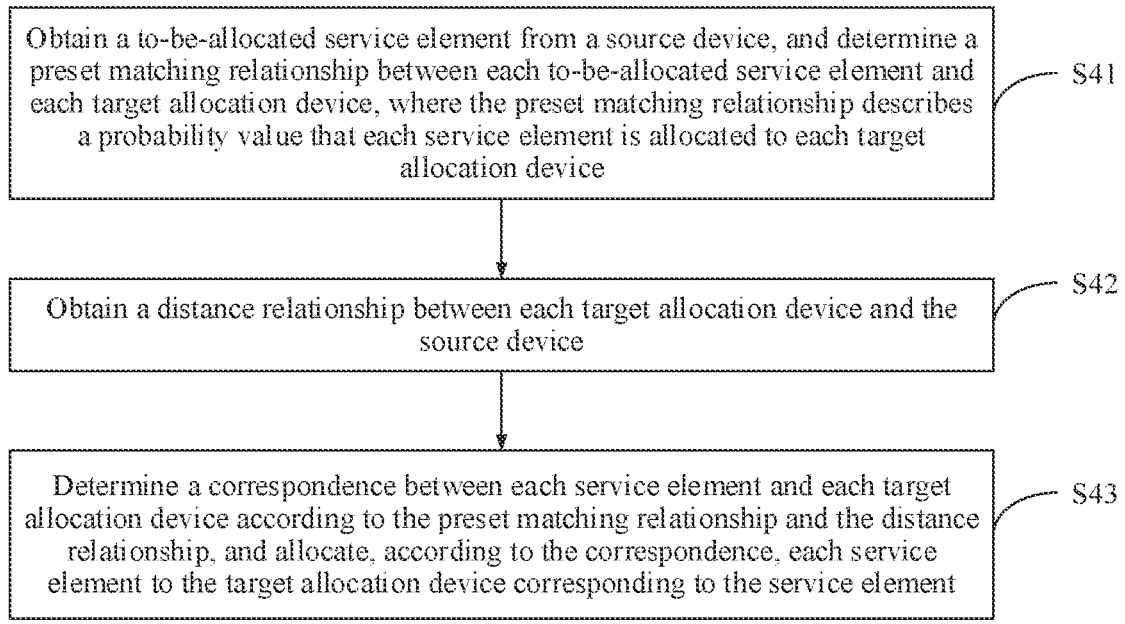
FIG. 4 is a schematic flowchart of a cross-device allocation method for a service element according to an embodiment of this application.

FIG. 4 is a schematic flowchart of a cross-device allocation method for a service element according to an embodiment of this application. In this embodiment of this application, a procedure may be performed by a source device. By way of example, and not limitation, the source device may be the mobile phone in FIG. 1. As shown in FIG. 4, the cross-device allocation method for the service element provided in this embodiment may include S41 to S44, which are described in detail as follows.

S41: Obtain a to-be-allocated service element from the source device, and determine a preset matching relationship between each to-be-allocated service element and each target allocation device, where the preset matching relationship describes a probability value that each service element is allocated to each target allocation device.

In this embodiment, the to-be-allocated service element may be a service element included in a service currently being implemented by the source device, including but not limited to a task element and/or an interface element included in the service currently being implemented by the source device. All these service elements may be allocated to the target allocation device when the source device implements a corresponding service, so that the target allocation device executes or displays the service elements allocated to the target allocation device. In actual application, the source device may currently implement one or at least two services, and a service element included in each service currently being implemented by the source device may be allocated to the target allocation device. In this embodiment, there may be at least one to-be-allocated service element.

In a specific implementation of this embodiment, the source device may obtain, from a task list of the source device, a task element included in the service currently being implemented by the source device. At the same time, the source device may use a user interface (User Interface, UI) element identification tool to identify and obtain an interface element included in the service currently being implemented. By way of example, and not limitation, the UI element identification tool may be specifically a UIAutomtion tool.

In this embodiment, the target allocation device may be a terminal device located in a same network as the source device. By way of example, and not limitation, the network may be a wireless network, that is, the target allocation device may be a terminal device located in a same wireless network as the source device. In this embodiment, before determining the preset matching relationship between each to-be-allocated service element and each target allocation device, the source device needs to first determine the target allocation device.

In a possible implementation, the source device may determine each terminal device located in a same network as the source device as the target allocation device. For example, as shown in FIG. 1, it is assumed that the mobile phone 100 in FIG. 1 is a source device of a user. The mobile phone 100 may determine the first television 200, the tablet computer 300, the wearable device 400, and the second television 500 as target allocation devices, where they are located in a same wireless network as the mobile phone 100.

Figure 5:
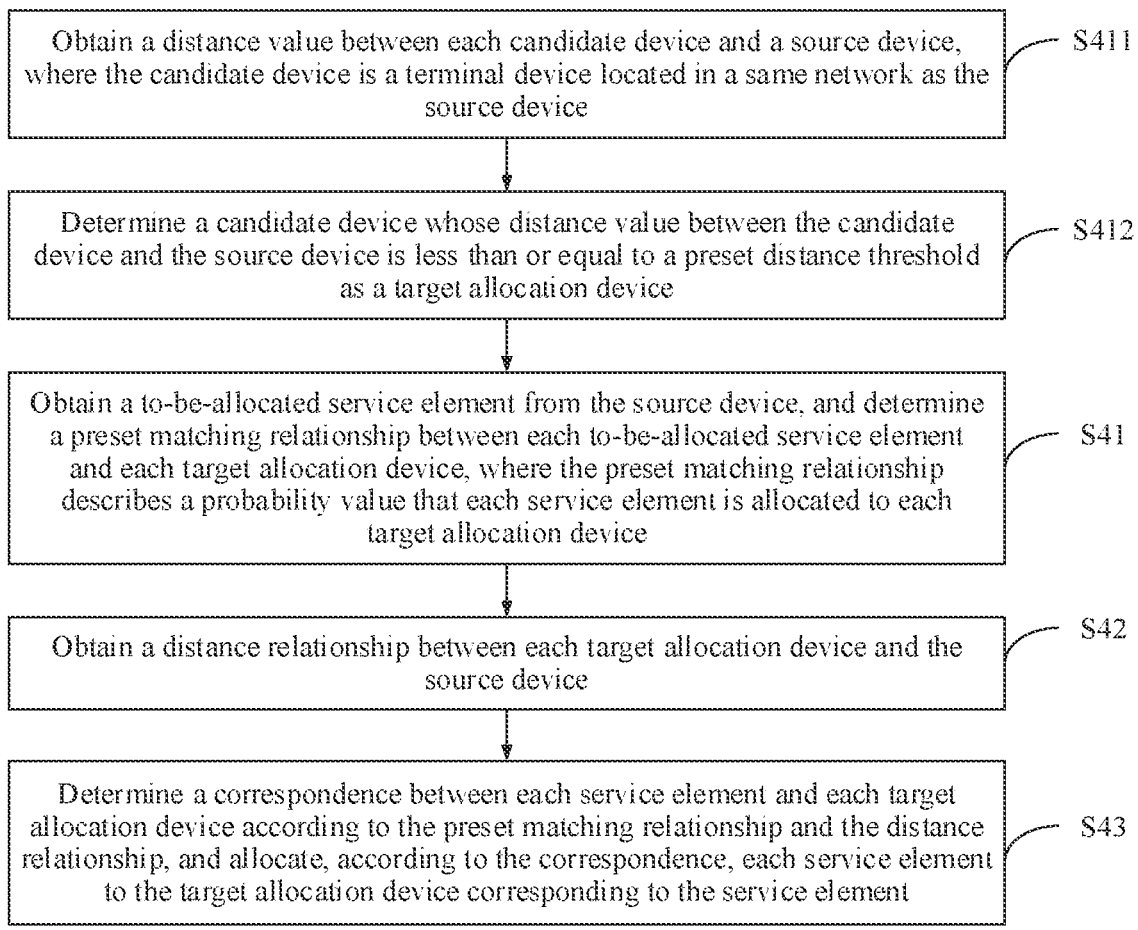
FIG. 5 is a schematic flowchart of a cross-device allocation method for a service element according to another embodiment of this application.

In another possible implementation, when the to-be-allocated service element relates to user privacy, to reduce a user privacy leakage risk, the source device may not allocate the service element to a terminal device that is far away from the source device. In other words, the source device may not use the terminal device that is far away from the source device as the target allocation device. Based on this, in this implementation, before S41, the cross-device allocation method for the service element may further include S411 and S412 shown in FIG. 5. Details are as follows:

S411: Obtain a distance value between each candidate device and the source device, where the candidate device is a terminal device located in a same network as the source device.

S412: Determine a candidate device whose distance value between the candidate device and the source device is less than or equal to a preset distance threshold as the target allocation device.

In actual application, a distance value between two terminal devices may be determined based on a received signal strength indication (Received Signal Strength Indication, RSSI) value when the two terminal devices perform wireless communication. Therefore, in this implementation, when determining the target allocation device from the terminal device located in a same network as the source device, the source device may obtain an RSSI value when the source device performs wireless communication with each terminal device located in a same network as the source device, and determine, based on the RSSI value when the source device performs wireless communication with each terminal device located in the same network as the source device, a distance value between the source device and each terminal device located in the same network as the source device. The source device may determine, as the target allocation device, a terminal device, from the terminal device located in the same network as the source device, whose distance value between the terminal device and the source device is less than or equal to a preset distance threshold. The preset distance threshold may be set based on actual requirements, and is not specifically limited in this embodiment. For example, it is assumed that the mobile phone 100 in FIG. 1 is the source device of the user, a distance value between the second television 500 and the mobile phone 100 is greater than the preset distance threshold, and distance values between other terminal devices and the mobile phone 100 each are less than the preset distance threshold. In this case, the mobile phone 100 may determine only the first television 200, the tablet computer 300, and the wearable device 400 as target allocation devices.

In a specific implementation, the source device may perform S411 and S412 only when detecting that the to-be-allocated service element relates to the user privacy. In this implementation, the source device determines only a terminal device that is close to the source device as the target allocation device. In other words, the source device subsequently allocates the service element only to the terminal device that is close to the source device, and does not allocate the service element to a terminal device that is far from the source device. Therefore, a user privacy leakage risk can be reduced.

It may be understood that, since there may be at least one terminal device located in the same network as the source device, there may be at least one target allocation device in this embodiment.

In this embodiment, the preset matching relationship between each to-be-allocated service element and each target allocation device describes a pre-obtained probability value that each to-be-allocated service element is allocated to each target allocation device.

In an embodiment of this application, the preset matching relationship may specifically include: a first matching relationship, corresponding to a target user type of a target user, between each to-be-allocated service element and each target allocation device; and/or a second matching relationship, determined based on a specified allocation operation performed by the target user on the to-be-allocated service element, between each to-be-allocated service element and each target allocation device. The target user is a user currently using the source device.

In actual application, users may be classified into users of a plurality of different user types based on different preset user attributes, that is, all users of a same user type have the same preset user attributes. The preset user attribute may include a user attribute of only one dimension, or may include user attributes of at least two dimensions, which is specifically set based on actual requirements and is not specially limited herein. For example, the preset user attribute may include but is not limited to one or a combination of at least two of user attribute dimensions such as age, occupation, preference, gender, and environment.

In this embodiment, the first matching relationship describes a first probability value, corresponding to the target user type, that each to-be-allocated service element is allocated to each target allocation device. The second matching relationship is used to describe a second probability value, determined based on the specified allocation operation performed by the target user on the to-be-allocated service element, that each to-be-allocated service element is allocated to each target allocation device. In actual application, the first matching relationship may be represented by using a first matching matrix. A value of each element in the first matching matrix indicates a first probability value, corresponding to a target user type, that a to-be-allocated service element corresponding to the element is allocated to a target allocation device corresponding to the element. A larger value of an element in the first matching matrix indicates a higher probability that a to-be-allocated service element corresponding to the element is allocated to a target allocation device corresponding to the element. The second matching relationship may be represented by using a second matching matrix, and a value of each element in the second matching matrix indicates a second probability value, determined based on a specified allocation operation performed by a target user on a to-be-allocated service element, that a to-be-allocated service element corresponding to the element is allocated to a target allocation device corresponding to the element. A larger value of an element in the second matching matrix indicates a higher probability that a to-be-allocated service element corresponding to the element is allocated to a target allocation device corresponding to the element.

For example, the first matching matrix may be $U=\{u_{i,j}\}$, and $u_{i,j}$ is a first probability value, corresponding to a target user type, that an $i^{th}$ service element is allocated to a $j^{th}$ target allocation device, where $i=1, 2, \ldots,$ and q, and $j=1, 2, \ldots,$ and m. The second matching matrix may be $P=\{p_{i,j}\}$, and $p_{i,j}$ is a second probability value, determined based on a specified allocation operation performed by a target user on a to-be-allocated service element, that the $i^{th}$ to-be-allocated service element is allocated to the $j^{th}$ target allocation device.

In this embodiment, that the source device determines the preset matching relationship between each to-be-allocated service element and each target allocation device may specifically include the following steps:

obtaining a first matching relationship, corresponding to a target user type of a target user, between each service element and each target allocation device; and/or obtaining a second matching relationship, determined based on a specified allocation operation performed by the target user on the service element, between each service element and each target allocation device.

In actual application, corresponding to the target user type, the first matching relationship between each to-be-allocated service element and each target allocation device may be obtained through big data analysis. Specifically, before the first matching relationship, corresponding to the target user type, between each to-be-allocated service element and each target allocation device is obtained, for each user type, score values of service elements that are included in each service that may be implemented on the source device by several users of the user type and that are relative to each preset element attribute and score values, from the several users of the user type, of each type of terminal device relative to each preset device attribute can be obtained in a manner of a questionnaire survey, a crowdsourcing technology, or the like. There may be at least one dimension of the preset element attribute or at least one dimension of the preset device attribute, and each preset element attribute is the same as each preset device attribute.

For example, dimensions of the preset element attribute may include but are not limited to: audibility, visibility, operability, editability, privacy, and the like, which respectively indicate whether the service element is audible, visible, operable, editable, privacy-related, and the like. In actual application, a preset element attributes each may further include at least one sub-attribute. For example, the element attribute of visibility may include but is not limited to a sub-attribute of clarity, which indicates clarity of the service element. The element attribute of operability may include but is not limited to sub-attributes such as touchability, keyability, and mouse controllability, which respectively indicate whether the service element is touchable, keyable, and mouse-controllable.

Correspondingly, dimensions of the preset device attribute may also include but are not limited to: audibility, visibility, operability, editability, privacy, and the like, which respectively indicate whether the terminal device is audible, visible, operable, editable, capable of privacy protection, and the like. In actual application, a preset device attribute may further include at least one sub-attribute. For example, the element attribute of visibility may include but is not limited to sub-attributes such as videoability, graphicability, and textuality, which respectively indicate whether the terminal device can display a video, can display a graph, can display a text, and the like. The element attribute of operability may include but is not limited to sub-attributes such as touchability, keyability, and mouse controllability, which respectively indicate whether the terminal device is touchable, keyable, and mouse controllable.

In actual application, a value range of the score value of the service element relative to each preset element attribute may be defined as a first preset score value range, and a value range of the score value of the terminal device relative to each preset device attribute may be defined as a second preset score value range. The first preset score value range and the second preset score value range may be set based on actual requirements. For example, both the first preset score value range and the second preset score value range may be [0,10].

within a range of (0,10]. When a value of a type of terminal device relative to a preset device attribute is no, a score value of the type of terminal device relative to the preset device attribute may be 0. More specifically, when a value of a type of terminal device relative to a sub-attribute included in a preset device attribute is yes, a score value of the type of terminal device relative to the sub-attribute included in the preset device attribute may be 1 within a range of (0,10]. When a value of a type of terminal device relative to a sub-attribute included in a preset device attribute is no, a score value of the type of terminal device relative to the sub-attribute included in the preset device attribute may be 0.

For ease of understanding, Table 1 shows an example of score values of service elements that are included in various services that may be implemented on a source device by a user and that are relative to a preset element attribute, where R is a quantity of all service elements included in all services that may be implemented by the source device. Table 2 shows an example of score values, from a user, of various types of terminal devices relative to a preset device attribute, where S is a quantity of the types of terminal devices.

TABLE 1

| Service element | | | | Operability | | |
|---|---|---|---|---|---|---|
| Preset element attribute | Audibility | Visibility | ... | Touchability | Keyability | Mouse controllability |
| Service element 1 | 2 | 3 | ... | 1 | 0 | 0 |
| Service element 2 | 1 | 0 | ... | 1 | 0 | 0 |
| ... | ... | ... | ... | ... | ... | ... |
| Service element R | 0 | 4 | ... | 0 | 1 | 1 |

TABLE 2

| Type of terminal device | | | | Operability | | |
|---|---|---|---|---|---|---|
| Preset device attribute | Audibility | Visibility | ... | Touchability | Keyability | Mouse controllability |
| Type 1 | 1 | 4 | ... | 1 | 0 | 0 |
| Type 2 | 2 | 0 | ... | 1 | 0 | 0 |
| ... | ... | ... | ... | ... | ... | ... |
| Type S | 0 | 3 | ... | 0 | 1 | 1 |

By way of example, and not limitation, when a value of a service element relative to a preset element attribute is yes, a score value of the service element relative to the preset element attribute may be within a range of (0,10]. When a value of a service element relative to a preset element attribute is no, a score value of the service element relative to the preset element attribute may be 0. More specifically, when a value of a service element relative to a sub-attribute included in a preset element attribute is yes, a score value of the service element relative to the sub-attribute included in the preset element attribute may be within a range of (0,10]. When a value of a service element relative to a sub-attribute included in a preset element attribute is no, a score value of the service element relative to the sub-attribute included in the preset element attribute may be 0.

When a value of a type of terminal device relative to a preset device attribute is yes, a score value of the type of terminal device relative to the preset device attribute may be It should be noted that, in actual application, for a preset element attribute including at least two sub-attributes, when a score value of a service element relative to the preset element attribute is determined, a weighted sum of score values of the service element relative to the at least two sub-attributes included in the preset element attribute may be used as the score value of the service element relative to the preset element attribute. For a preset device attribute including at least two sub-attributes, when a score value of a type of terminal device relative to the preset device attribute is determined, a weighted sum of score values of the type of terminal device relative to the at least two sub-attributes included in the preset device attribute may be used as the score value of the type of terminal device relative to the preset device attribute.

In this embodiment, after score values, from several users corresponding to each user type, of each service element relative to each preset element attribute and score values, from several users corresponding to each user type, of each type of terminal device relative to each preset device attribute are obtained, a score value of each service element that corresponds to each user type and that is relative to each preset element attribute may be obtained through big data analysis based on the score values, from the several users corresponding to each user type, of each service element relative to each preset element attribute, and score values of each type of terminal device that corresponds to each user type and that is relative to each preset device attribute may be obtained through big data analysis based on the score values, from the several users corresponding to each user type, of each type of terminal device relative to each preset device attribute.

In this embodiment, after the score value, corresponding to each user type, of each service element relative to each preset element attribute and the score value, corresponding to each user type, of each type of terminal device relative to each preset device attribute are obtained, the score value, corresponding to each user type, of each service element relative to each preset element attribute may be stored in an element attribute matrix table in a server, and the score value, corresponding to each user type, of each type of terminal device relative to each preset device attribute may be stored in a device attribute matrix table in the server. The element attribute matrix table may be similar to Table 1, and the device attribute matrix table may be similar to Table 2.

In actual application, as time changes, the user may change the score value of each service element relative to each preset element attribute, or the user may change the score value of each type of terminal device relative to each preset device attribute. Therefore, in this embodiment, score values, from users of various different user types, of each service element relative to each preset element attribute, and score values, from users of various different user types, of each type of terminal device relative to each preset device attribute may alternatively be periodically re-collected. Then, the score value, corresponding to each user type, of each service element relative to each preset element attribute, and the score value, corresponding to each user type, of each type of terminal device relative to each preset device attribute are updated based on the re-collected data.

Based on this, that the source device obtains the first matching relationship, corresponding to the target user type of the target user, between each service element and each target allocation device may specifically include the following steps:

obtaining a score value, corresponding to the target user type, of each service element relative to each preset element attribute;

obtaining a score value, corresponding to the target user type, of each target allocation device relative to each preset device attribute; and obtaining the first matching relationship based on the score value of each service element relative to each preset element attribute and the score value of each target allocation device relative to each preset device attribute.

In this embodiment, the source device may obtain, from the element attribute matrix table, stored in the server, corresponding to the target user type, the score value of each to-be-allocated service element relative to each preset element attribute, and obtain, from the device attribute matrix table corresponding to the target user type, a score value of a device type of each target allocation device relative to each preset device attribute. In actual application, the obtained score value, corresponding to the target user type, of each to-be-allocated service element relative to each preset element attribute may be represented by using an element attribute matrix, and the obtained score value, corresponding to the target user type, of each target allocation device relative to each preset device attribute may be represented by using an element attribute matrix. The source device may perform a multiplication operation on the element attribute matrix and the device attribute matrix, to obtain the first matching matrix indicating the first matching relationship, corresponding to the target user type, between each to-be-allocated service element and each target allocation device.

For example, it is assumed that the element attribute matrix is $E=\{e_{i,k}\}$, and $e_{i,k}$ is a score value, corresponding to a target user type, of an $i^{th}$ to-be-allocated service element relative to a $k^{th}$ preset element attribute; and it is assumed that the device attribute matrix is $D=\{d_{k,j}\}$, and $d_{k,j}$ is a score value, corresponding to a target user type, of a $j^{th}$ target allocation device relative to a $k^{th}$ preset device attribute. The first matching matrix indicating the first matching relationship may be $U=E*D=\Sigma_{k=1}^{c}e_{i,k}*d_{k,j}$, $k=1, 2, \ldots$, and c, and c is a dimension of the preset element attribute and the preset device attribute.

In this embodiment, the second matching relationship is determined based on a specified allocation operation performed by a target user on a to-be-allocated service element. The specified allocation operation is an operation of specifying to allocate a service element to a target allocation device.

In actual application, after the source device performs cross-device allocation on some service elements each time, if the target user is not satisfied with an allocation result of the source device, the target user may perform a specified allocation operation on an allocated unsatisfied service element, so that the source device allocates a service element specified by the target user to a target allocation device specified by the target user. In this embodiment, the source device may maintain, based on a specified allocation operation performed by a target user on a service element, a relational matrix table describing a second probability value that a specified service element is allocated to each type of terminal device. A value of each element in the relational matrix table indicates a second probability value, determined based on a specified allocation operation performed by a target user, that a service element corresponding to the element is allocated to a terminal device type corresponding to the element.

Specifically, the second probability value that the specified service element is allocated to the type of terminal device may be determined based on a quantity of times that the service element is specified by a user and allocated to the type of terminal device. By way of example, and not limitation, the second probability value that the service element is allocated to the type of terminal device may change linearly or nonlinearly based on the quantity of times that the service element is specified by the user and allocated to the type of terminal device. A larger quantity of times that the service element is specified by the user and allocated to the type of terminal device indicates a larger second probability value, determined based on the specified allocation operation performed by the target user, that the service element is allocated to the type of terminal device. A smaller quantity of times that the service element is specified by the user and allocated to the type of terminal device indicates a smaller second probability value, determined based on the specified allocation operation performed by the target user, that the service element is allocated to the type of terminal device. In actual application, a value range of the second probability value may be limited based on actual requirements.

In this embodiment, the source device may update the value of the element in the relational matrix table each time after the user performs the specified allocation operation on the service element.

In this embodiment, when obtaining the second matching relationship between each to-be-allocated service element and each target allocation device, the source device may obtain, from a pre-maintained relational matrix table based on the to-be-allocated service element and a type of the target allocation device, the second probability value, determined based on the specified allocation operation performed by the target user on the to-be-allocated service element, of each to-be-allocated service element relative to each target allocation device. When there are no second probability values of some to-be-allocated service elements relative to each target allocation device in the relational matrix table, the source device may use a minimum value corresponding to a value range of the second probability value as the second probability values of the to-be-allocated service elements relative to each target allocation device. After obtaining the second probability value of each to-be-allocated service element relative to each target allocation device, the source device obtains the second matching matrix indicating the second matching relationship.

S42: Obtain a distance relationship between each target allocation device and the source device.

In this embodiment, the distance relationship between each target allocation device and the source device may be represented by using a distance matrix. A value of each element in the distance matrix indicates a distance value between a target allocation device corresponding to the element and the source device.

For example, the distance matrix may be $D=\{d_j\}$, where $j=1, 2, \ldots,$ and m, and m is a quantity of target allocation devices, and $d_j$ indicates a distance value between a $j^{th}$ target allocation device and the source device.

In a specific implementation, the source device may obtain an RSSI value when the source device performs wireless communication with each target allocation device, and determine a distance value between the source device and each target allocation device based on the RSSI value when the source device performs wireless communication with each target allocation device.

S43: Determine a correspondence between each service element and each target allocation device according to the preset matching relationship and the distance relationship, and allocate, according to the correspondence, each service element to the target allocation device corresponding to the service element.

In this embodiment, after obtaining the first matching relationship, corresponding to the target user type, between each to-be-allocated service element and each target allocation device, the second matching relationship, determined based on the specified allocation operation performed by the target user on the to-be-allocated service element, between each to-be-allocated service element and each target allocation device, and the distance relationship between each target allocation device and the source device, the source device may determine a correspondence between each to-be-allocated service element and each target allocation device based on the first matching relationship, the second matching relationship, and the distance relationship, and allocate, according to the correspondence, each to-be-allocated service element to the target allocation device corresponding to the to-be-allocated service element. The correspondence between each to-be-allocated service element and each target allocation device describes whether each to-be-allocated service element needs to be allocated to each target allocation device. It should be noted that a same to-be-allocated service element may be allocated to different target allocation devices, and different to-be-allocated service elements may also be allocated to a same target allocation device.

In a specific implementation of this embodiment, S43 may specifically include the following steps:

determining the correspondence between each service element and each target allocation device according to the first matching relationship, the second matching relationship, and the distance relationship by using a preset linear programming equation, where the preset linear programming equation is:

$$Max\Sigma_{i,j=1}^{q,m} w_1 UX + w_2 PX + w_3 DX, \ n_i = \Sigma_{k=1}^{m} x_{i,k}; \text{ where}$$

$w_1$ is a preset weight of the first matching relationship, $w_2$ is a preset weight of the second matching relationship, $w_3$ is a preset weight of the distance relationship, $w_1+w_2+w_3=1$, and $w_3 \neq 0$; q is a quantity of to-be-allocated service elements; and m is a quantity of target allocation devices; U is the first matching relationship, $U=\{u_{i,j}\}$, $u_{i,j}$ is a first probability value that an $i^{th}$ service element is allocated to a $j^{th}$ target allocation device, $i=1, 2, \ldots,$ and q, and $j=1, 2, \ldots,$ and m; P is the second matching relationship, $P=\{p_{i,j}\}$, and $p_{i,j}$ is a second probability value that the $i^{th}$ service element is allocated to the $j^{th}$ target allocation device; D is the distance relationship, $D=\{d_j\}$, and $d_j$ is a distance value between the $j^{th}$ target allocation device and the source device; X is the correspondence, $X=\{x_{i,j}\}$, $x_{i,j}$ indicates whether the $i^{th}$ service element needs to be allocated to the $j^{th}$ target allocation device, a value of $x_{i,j}$ is 1 or 0, when the value of $x_{i,j}$ is 1, it indicates that the $i^{th}$ service element needs to be allocated to the $j^{th}$ target allocation device, and when the value of $x_{i,j}$ is 0, it indicates that the $i^{th}$ service element does not need to be allocated to the $j^{th}$ target allocation device; and $n_i$ is a quantity of target allocation devices to which the $i^{th}$ service element can be allocated.

In this implementation, $Max\Sigma_{i,j=1}^{q,m} w_1 UX + w_2 PX + w_3 DX$ indicates a value of X when a maximum value of $\Sigma_{i,j=1}^{q,m} w_1 UX + w_2 PX + w_3 DX$ is obtained when U, P, D, $w_1$, $w_2$, and $w_3$ are all known.

In a specific implementation, when no terminal device involved when the target user performs the specified allocation operation previously exists in a network that the source device is located, for example, when the source device joins a new network, and all terminal devices in the network are terminal devices not involved when the target user performs the specified allocation operation previously, a value of $w_2$ may be set to 0, and the correspondence between each to-be-allocated service element and each target allocation device is determined only according to the first matching relationship and the distance relationship.

In this implementation, since the first matching relationship is obtained through big data analysis on data of a user of a same user type as the target user, and the users of the same user type usually have a same preference, when the target user does not perform the specified operation, in this embodiment, an allocation cross-device allocation result performed on the to-be-allocated service element based on the first matching relationship and the distance relationship can roughly meet a requirement of the target user.

In another specific implementation, when the target user performs the specified allocation operation on all to-be-allocated service elements, and the target allocation devices are terminal devices involved when the target user performs the specified allocation operation previously, a value of $w_1$ may be set to 0, and the correspondence between the to-be-allocated service element and the target allocation device is determined only according to the second matching relationship and the distance relationship.

Figure 6:
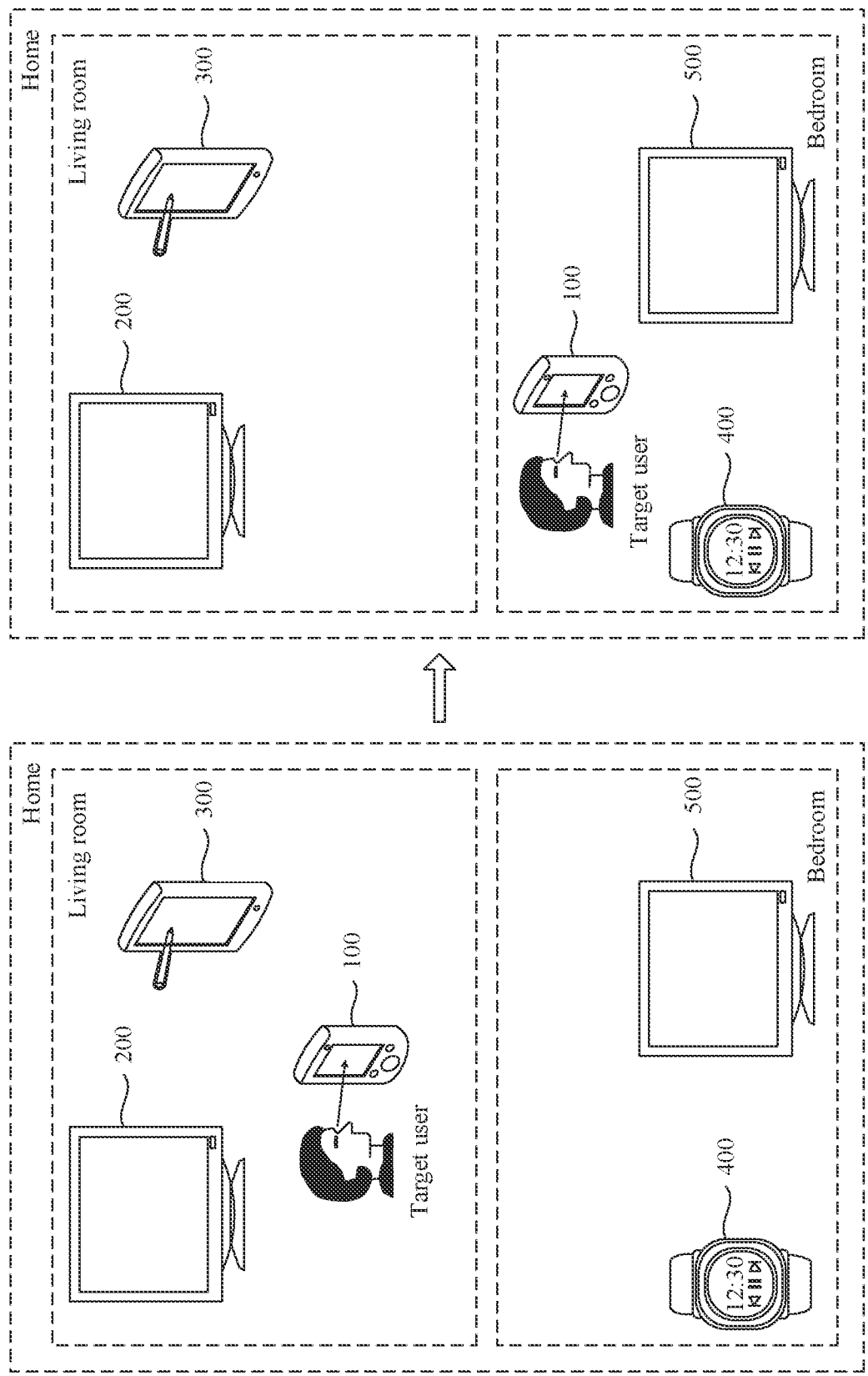
FIG. 6 is a schematic diagram of a specific scenario to which a cross-device allocation method for a service element is applicable according to an embodiment of this application.

For example, FIG. 6 is a schematic diagram of a specific scenario to which a cross-device allocation method for a service element is applicable according to an embodiment of this application. As shown in FIG. 6, it is assumed that a first television 200 and a tablet computer 300 are in a living room of a target user, and a wearable device 400 and a second television 500 are in a bedroom of the target user. As shown in (a) in FIG. 6, it is assumed that a source device (a mobile phone 100) of the target user is playing music at a moment, at this moment, the target user carries the mobile phone 100 in the living room, and a cross-device allocation result of the mobile phone 100 for service elements included in the music playing service may be: allocating a music playing task and interface elements such as a song cover, a song name, lyrics, and an operation control to the first television 200, so that the first television 200 performs the music playing task, and displays the interface elements such as the song cover, the song name, the lyrics, and the operation control; allocating interface elements such as a song cover, a song comment, and an operation control to the tablet computer 300, so that the tablet computer 300 displays the interface elements such as the song cover, the song comment, and the operation control; and not allocating a service element to the wearable device 400 and the second television 500.

It is assumed that at another moment, the target user carries the mobile phone 100 and moves to the bedroom, the mobile phone 100 may adjust the previous service element allocation result, and an adjusted allocation result may be: allocating a music playing task and interface elements such as a song cover, a song name, lyrics, and an operation control to the second television 500, so that the second television 500 performs the music playing task, and displays the interface elements such as the song cover, the song name, the lyrics, and the operation control; allocating interface elements such as a song cover, a song name, and an operation control to the wearable device 400, so that the wearable device 400 displays the interface elements such as the song cover, the song name, and the operation control; and not allocating a service element to the first television 200 and the tablet computer 300.

In this implementation, cross-device allocation is performed on each to-be-allocated service element completely according to the previous specified allocation operation performed by the target user on the to-be-allocated service element and the distance relationship between each target allocation device and the source device, so that personalized allocation of the service element is totally implemented.

It can be learned from the foregoing description that the cross-device allocation method for the service element provided this application is used to determine the correspondence between each service element and each target allocation device according to the preset matching relationship between each to-be-allocated service element and each target allocation device and the distance relationship between each target allocation device and the source device, and allocate, according to the correspondence, each service element to the target allocation device corresponding to the service element. In this way, when a location of the source device changes, the distance relationship between each target allocation device and the source device also changes, and the correspondence determined according to the preset matching relationship and the distance relationship also changes, so that the service element allocated to each target allocation device also correspondingly changes. Compared with the conventional technology, in the cross-device allocation method for the service element provided in this embodiment, a service element allocation policy can be adjusted based on the change in the distance between the source device and each target allocation device, so that intelligence of cross-device allocation of the service element can be improved.

In actual application, since the source device is usually a terminal device carried by the user, when the user moves, the source device usually moves with the user. When the source device moves with the user, a distance between the source device and each target allocation device changes, so that a service element allocated to each target allocation device needs to be adjusted. Based on this, in another embodiment of this application, when the target allocation device does not include a preset wearable device, after S43, the cross-device allocation method for the service element may further include S44 to S46 shown in FIG. 7. Details are as follows:

S44: Obtain motion data of the source device in real time.

S45: If it is detected, based on the motion data, that a location of the source device changes, re-obtain the distance relationship between each target allocation device and the source device.

S46: Re-determine the correspondence according to the preset matching relationship and the re-obtained distance relationship, and allocate, according to the re-determined correspondence, each service element to the target allocation device corresponding to the service element.

In this embodiment, when the target allocation device does not include the preset wearable device, after allocating each to-be-allocated service element to each target allocation device, the source device may obtain the motion data of the source device in real time by using a built-in motion sensor of the source device, and detects, based on the motion data of the source device, whether the location of the source device changes.

When the source device detects that the location of the source device changes, it indicates that a current location of the target user changes. In this case, the source device may re-obtain the distance value between each target allocation device and the source device, to obtain a new distance relationship between each target allocation device and the source device. The source device may re-determine the correspondence according to the preset matching relationship and the re-obtained new distance relationship, and re-allocate, according to the re-determined correspondence, each to-be-allocated service element to the target allocation device corresponding to the to-be-allocated service element. It should be noted that, in this implementation, a specific cross-device allocation manner in which the source device performs, based on the preset matching relationship and the re-obtained new distance relationship, the to-be-allocated service element is the same as the allocation manner in S43. For details, refer to related descriptions in S43, details are not described herein again.

In a specific implementation of this embodiment, when detecting that the location of the source device changes, the source device may obtain an RSSI value when the source device currently performs wireless communication with each target allocation device, and determine a current distance value between the source device and each target allocation device based on the RSSI value when the source device currently performs wireless communication with each target allocation device, to obtain a new distance relationship.

In a preferred implementation of the embodiment, when detecting that the location of the source device changes, the source device may further determine a moving track of the source device based on current motion data of the source device by using a pedestrian dead reckoning (Pedestrian Dead Reckoning, PDR) technology, and determine a current distance value between the source device and each target allocation device based on the motion track of the target allocation device. The source device may determine the current actual distance value between the source device and each target allocation device based on both the current distance value, determined based on the RSSI value, between the source device and each target allocation device and the current distance value, obtained based on the PDR technology, between the source device and each target allocation device, and obtain the new distance relationship based on the current actual distance value between the source device and each target allocation device, so that accuracy of the obtained new distance relationship can be improved.

In this embodiment, when detecting that the current location of the source device changes, the source device considers that a current location of the target user changes. In this case, the source device re-obtains the current distance relationship between the source device and each target allocation device, and adjusts, according to the re-obtained distance relationship, the service element allocated to each target allocation device, so that a cross-device allocation result of the service element is more suitable for an actual scenario of the user, and intelligence of cross-device allocation of the service element can be improved.

Figure 8:
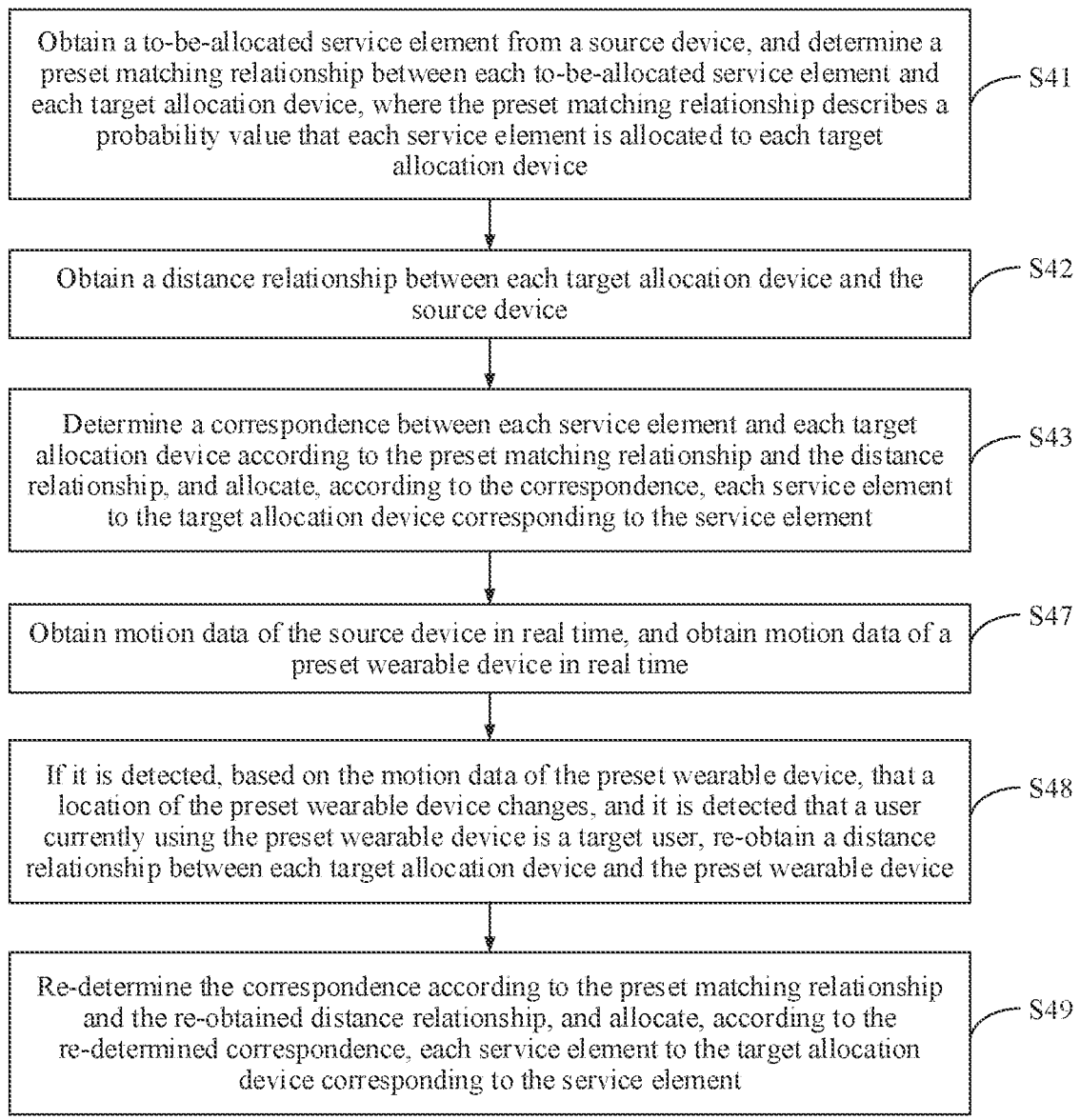
FIG. 8 is a schematic flowchart of a cross-device allocation method for a service element according to yet another embodiment of this application.

In still another embodiment of this application, when the target allocation device includes a preset wearable device, when moving, the user may carry the source device, or may wear the preset wearable device. Therefore, in this embodiment, after S43, the cross-device allocation method for the service element may further include S47 to S49 shown in FIG. 8. Details are as follows:

S47: Obtain motion data of the source device in real time, and obtain motion data of the preset wearable device in real time.

S48: If it is detected, based on the motion data of the preset wearable device, that a location of the preset wearable device changes, and it is detected that a user currently using the preset wearable device is a target user, re-obtain a distance relationship between each target allocation device and the preset wearable device.

S49: Re-determine the correspondence according to the preset matching relationship and the re-obtained distance relationship, and allocate, according to the re-determined correspondence, each service element to the target allocation device corresponding to the service element.

In this embodiment, when the target allocation device includes the preset wearable device, after allocating each to-be-allocated service element to each target allocation device, the source device may obtain the motion data of the source device in real time by using a built-in motion sensor of the source device. The source device may further control the preset wearable device to obtain the motion data of the preset wearable device in real time by using the built-in motion sensor of the preset wearable device. Specifically, the source device may send a data collection instruction to the preset wearable device, to control the preset wearable device to obtain the motion data of the preset wearable device in real time.

After obtaining the motion data of the source device and the motion data of the preset wearable device, the source device may detect, based on the motion data of the source device, whether the location of the source device changes, and detect, based on the motion data of the preset wearable device, whether the location of the preset wearable device changes.

In a possible implementation of this embodiment, when detecting that the location of the preset wearable device changes, the source device may send an identity confirmation instruction to the preset wearable device, to indicate the preset wearable device to confirm whether the user currently using the preset wearable device is the target user. Specifically, the preset wearable device may confirm, in a manner of inquiring the user, an identity of the user currently using the preset wearable device, and send an identity confirmation result to the source device. When detecting based on the identity confirmation result, that the user currently using the preset wearable device is the target user, the source device considers that the preset wearable device is currently worn by the target user, and the target user currently moves. In this case, the source device may re-obtain the distance relationship between the preset wearable device and each target allocation device, re-determine the correspondence between each to-be-allocated service element and each target allocation device according to the preset matching relationship and the re-obtained new distance relationship, and reallocates, according to the re-determined correspondence, each to-be-allocated service element to the target allocation device corresponding to the to-be-allocated service element. The distance relationship between the preset wearable device and each target allocation device describes a distance value between each target allocation device and the preset wearable device.

In another possible implementation of this embodiment, when the source device detects only that the location of the source device changes, but the location of the preset wearable device does not change, it indicates that the source device may be currently carried by the target user, and the target user currently moves. In this case, the source device may re-obtain the distance relationship between the source device and each target allocation device, re-determine the correspondence between each to-be-allocated service element and each target allocation device according to the preset matching relationship and the re-obtained new distance relationship, and reallocate, according to the re-determined correspondence, each to-be-allocated service element to the target allocation device corresponding to the to-be-allocated service element.

Figure 7:
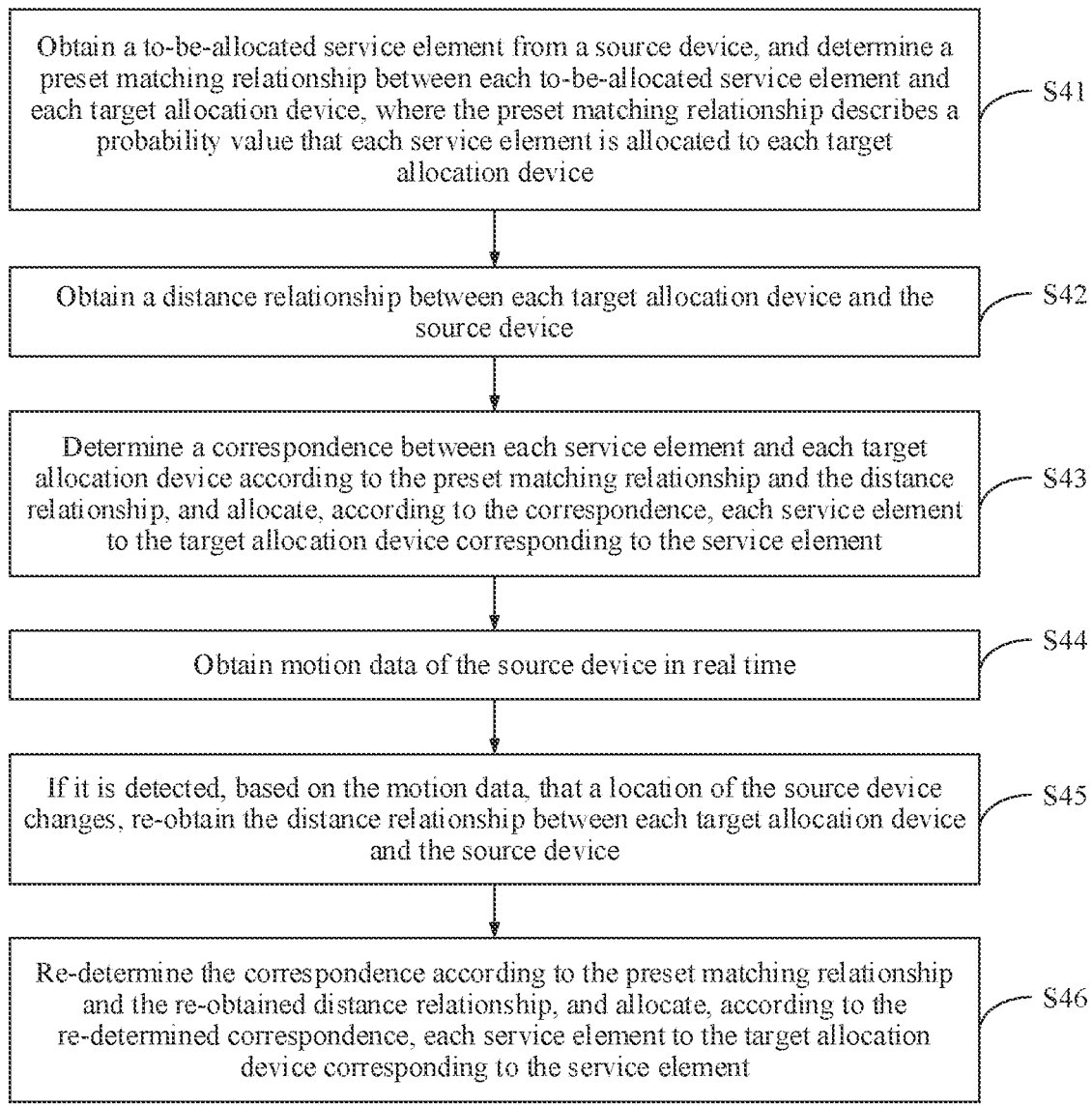
FIG. 7 is a schematic flowchart of a cross-device allocation method for a service element according to still another embodiment of this application.

It should be noted that, in this embodiment, a method for re-determining, by the source device, a distance value between the source device and each target allocation device is the same as the method for re-determining, by the source device, the distance value between the source device and each target allocation device in the embodiment corresponding to FIG. 7. For details, refer to related descriptions in the embodiment corresponding to FIG. 7. Details are not described herein again.

In this embodiment, change in the location of the target user is determined by considering both the change in the location of the source device or the change in the location of the preset wearable device, so that accuracy of identifying the change in the location of the target user can be improved.

In addition, when detecting that the location of the target user changes, the source device re-obtains the distance relationship between the current location of the target user and each target allocation device, and adjusts, according to the re-obtained distance relationship, the service element allocated to each target allocation device, so that a cross-device allocation result of the service element is more suitable for an actual scenario of the user, and intelligence of cross-device allocation of the service element can be improved.

In still another embodiment of this application, after the source device allocates the to-be-allocated service element to each target allocation device, if the target user is not satisfied with an allocation result of the source device, the target user may perform a specified allocation operation on an allocated unsatisfied service element. By way of example, and not limitation, that the target user performs the specified allocation operation on the allocated dissatisfied service element may be specifically represented as: The target user specifies the allocated unsatisfied service element to another target allocation device.

Based on this, after S4, the cross-device allocation method for the service element may further include the following steps:

allocating, in response to an allocation result adjustment instruction input by the target user, a service element indicated by the allocation result adjustment instruction to a target allocation device indicated by the allocation result adjustment instruction; and updating the second matching relationship in response to the allocation result adjustment instruction.

In this embodiment, when intending to adjust an allocation result of the service element, the target user may trigger, on the source device, a preset service element specified allocation operation, and select or input, on the source device, a service element that needs to be specified for allocation and a target allocation device to which the service element needs to be specified for allocation. When the source device detects that the user triggers the preset service element specified allocation operation, and detects the service element, input by the user, needing to be specified for allocation and the target allocation device to which the service element needs to be specified for allocation, it may be considered that the allocation result adjustment instruction input by the target user is detected, the allocation result adjustment instruction indicates the source device to adjust the service element allocation result in S3, that is, indicates the source device to allocate the service element indicated by the allocation result adjustment instruction to the target allocation device indicated by the allocation result adjustment instruction. The service element indicated by the allocation result adjustment instruction is the service element, input by the target user, needing to be specified for allocation, and the target allocation device indicated by the allocation result adjustment instruction is the target allocation device to which the service element needing to be adjusted needs to be specified for allocation.

When detecting the allocation result adjustment instruction input by the target user, the source device allocates the service element indicated by the allocation result adjustment instruction to the target allocation device indicated by the allocation result adjustment instruction. In addition, the source device may further update, according to the allocation result adjustment instruction, the second matching relationship, determined based on the specified allocation operation performed by the target user on the to-be-allocated service element, between the to-be-allocated service element and the target allocation device. Specifically, since the allocation result adjustment instruction identifies that the service element specified by the target user is allocated to the target allocation device specified by the target user, the source device may update the second matching relationship based on the second matching relationship determining method in S41, and an update process of the second matching relationship is not described herein again.

In this embodiment, since the source device may adjust an allocation result of the service element according to the allocation result adjustment instruction input by the target user, the current allocation result of the service element can better meet a personalized requirement of the target user. In addition, since the source device further updates the second matching relationship according to the allocation result adjustment instruction, an allocation result obtained when the source device performs cross-device allocation on the service element next time according to the second matching relationship better meets a personalized requirement of the target user.

It may be understood that sequence numbers of the processes do not mean execution sequences in the foregoing embodiments. The execution sequences of the processes should be determined according to functions and internal logic of the processes, and should not be construed as any limitation on the implementation processes of embodiments of this application.

Figure 9:
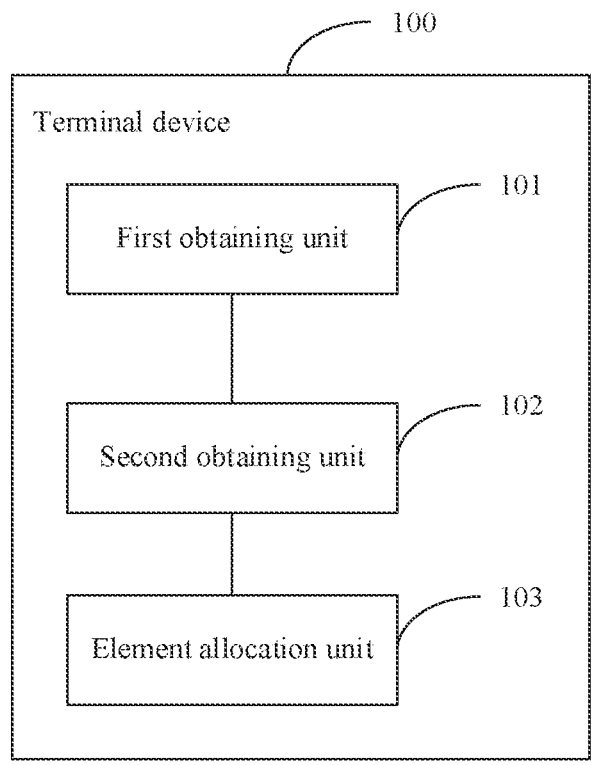
FIG. 9 is a schematic diagram of a structure of a terminal device according to an embodiment of this application.

Corresponding to the cross-device allocation method for the service element in the foregoing embodiment, FIG. 9 is a block diagram of a structure of a terminal device according to an embodiment of this application. Units included in the terminal device are configured to perform the steps in the foregoing embodiment. For details, refer to related descriptions in the foregoing embodiment. For ease of description, only a part related to this embodiment of this application is shown. In actual application, the terminal device may be a source device of a user. For example, the terminal device may be the mobile phone 100 in FIG. 1. Referring to FIG. 9, the terminal device 100 includes a first obtaining unit 101, a second obtaining unit 102, and an element allocation unit 103.

The first obtaining unit 101 is configured to obtain a to-be-allocated service element from the source device, and determine a preset matching relationship between each to-be-allocated service element and each target allocation device, where the preset matching relationship describes a probability value that each service element is allocated to each target allocation device.

The second obtaining unit 102 is configured to obtain a distance relationship between each target allocation device and the source device.

The element allocation unit 103 is configured to determine a correspondence between each service element and each target allocation device according to the preset matching relationship and the distance relationship, and allocate, according to the correspondence, each service element to the target allocation device corresponding to the service element.

In another embodiment of this application, the first obtaining unit 101 is specifically configured to:

obtain a first matching relationship, corresponding to a target user type of a target user, between each service element and each target allocation device; and/or obtain a second matching relationship, determined based on a specified allocation operation performed by the target user on the service element, between each service element and each target allocation device, where the target user is a user currently using the source device.

In yet another embodiment of this application, the first obtaining unit 101 may specifically include a first score value obtaining unit, a second score value obtaining unit, and a first determining unit.

The first score value obtaining unit is configured to obtain a score value, corresponding to the target user type, of each service element relative to each preset element attribute.

The second score value obtaining unit is configured to obtain a score value, corresponding to the target user type, of each target allocation device relative to each preset device attribute.

The first determining unit is configured to obtain the first matching relationship based on the score value of each service element relative to each preset element attribute and the score value of each target allocation device relative to each preset device attribute.

In still another embodiment of this application, the element allocation unit 103 is specifically configured to:
determine the correspondence between each service element and each target allocation device according to the first matching relationship, the second matching relationship, and the distance relationship by using a preset linear programming equation, where the preset linear programming equation is:

$$\text{Max}\Sigma_{i,j=1}^{q,m} w_1 UX + w_2 PX + w_3 DX, \ n_i = \Sigma_{k=1}^{m} x_{i,k}; \text{ where}$$

$w_1$ is a preset weight of the first matching relationship, $w_2$ is a preset weight of the second matching relationship, $w_3$ is a preset weight of the distance relationship, $w_1 + w_2 °w_3 = 1$, and $w_3 \neq 0$; q is a quantity of to-be-allocated service elements; and m is a quantity of target allocation devices; U is the first matching relationship, $U = \{u_{i,j}\}$, $u_{i,j}$ is a first probability value that an $i^{th}$ service element is allocated to a $j^{th}$ target allocation device, i=1, 2, ..., and q, and j=1, 2, ..., and m; P is the second matching relationship, $P = \{p_{i,j}\}$, and $p_{i,j}$ is a second probability value that the $i^{th}$ service element is allocated to the $j^{th}$ target allocation device; D is the distance relationship, $D = \{d_j\}$, and $d_j$ is a distance value between the $j^{th}$ target allocation device and the source device; X is the correspondence, $X = \{x_{i,j}\}$, $x_{i,j}$ indicates whether the $i^{th}$ service element needs to be allocated to the $j^{th}$ target allocation device, a value of $x_{i,j}$ is 1 or 0, when the value is $x_{i,j}$ is 1, it indicates that the $i^{th}$ service element needs to be allocated to the $j^{th}$ target allocation device, and when the value of $x_{i,j}$ is 0, it indicates that the $i^{th}$ service element does not need to be allocated to the $j^{th}$ target allocation device; and $n_i$ is a quantity of target allocation devices to which the $i^{th}$ service element can be allocated.

In still another embodiment of this application, the terminal device 100 further includes a third obtaining unit and a second determining unit.

The third obtaining unit is configured to obtain a distance value between each candidate device and the source device, where the candidate device is a terminal device located in a same network as the source device.

The second determining unit is configured to determine a candidate device whose distance value between the candidate device and the source device is less than or equal to a preset distance threshold as the target allocation device.

In still another embodiment of this application, the target allocation device does not include a preset wearable device.

Correspondingly, the terminal device 100 may further include a fourth obtaining unit, a fifth obtaining unit, and a first allocation unit.

The fourth obtaining unit is configured to obtain motion data of the source device in real time.

The fifth obtaining unit is configured to: if it is detected, based on the motion data, that a location of the source device changes, re-obtain the distance relationship between each target allocation device and the source device.

The first allocation unit is configured to re-determine the correspondence according to the preset matching relationship and the re-obtained distance relationship, and allocate, according to the re-determined correspondence, each service element to the target allocation device corresponding to the service element.

In still another embodiment of this application, the target allocation device includes a preset wearable device. Correspondingly, the terminal device 100 may further include a sixth obtaining unit, a seventh obtaining unit, and a second allocation unit.

The sixth obtaining unit is configured to obtain motion data of the source device in real time, and obtain motion data of the preset wearable device in real time.

The seventh obtaining unit is configured to: if it is detected, based on the motion data of the preset wearable device, that a location of the preset wearable device changes, and it is detected that a user currently using the preset wearable device is a target user, re-obtain a distance relationship between each target allocation device and the preset wearable device.

The second allocation unit is configured to re-determine the correspondence according to the preset matching relationship and the re-obtained distance relationship, and allocate, according to the re-determined correspondence, each service element to the target allocation device corresponding to the service element.

In still another embodiment of this application, the terminal device 100 may further include a third allocation unit and an updating unit.

The third allocation unit is configured to allocate, in response to an allocation result adjustment instruction input by the target user, a service element indicated by the allocation result adjustment instruction to a target allocation device indicated by the allocation result adjustment instruction.

The updating unit is configured to update the second matching relationship in response to the allocation result adjustment instruction.

It can be learned from the foregoing description that the terminal device provided in this embodiment of this application determines the correspondence between each service element and each target allocation device according to the preset matching relationship between each to-be-allocated service element and each target allocation device and the distance relationship between each target allocation device and the source device, and allocates, according to the correspondence, each service element to the target allocation device corresponding to the service element. In this way, when a location of the source device changes, the distance relationship between each target allocation device and the source device also changes, and the correspondence determined according to the preset matching relationship and the distance relationship also changes, so that the service element allocated to each target allocation device also correspondingly changes. Compared with the conventional technology, in the cross-device allocation method for the service element provided in this embodiment, a service element allocation policy can be adjusted based on the change in the distance between the source device and each target allocation device, so that intelligence of cross-device allocation of the service element can be improved.

Figure 10:
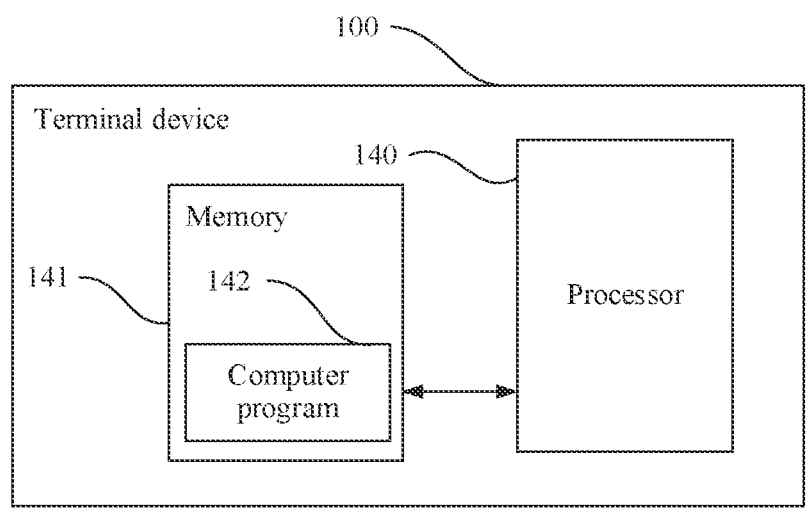
FIG. 10 is a schematic diagram of a structure of another terminal device according to an embodiment of this application.

FIG. 10 is a schematic diagram of a structure of a terminal device according to another embodiment of this application. As shown in FIG. 10, the terminal device 100 in this embodiment includes at least one processor 140 (only one processor is shown in FIG. 10), a memory 141, and a computer program 142 that is stored in the memory 141 and runs on the at least one processor 140. When executing the computer program 142, the processor 140 implements the steps in any of the foregoing embodiments of the cross-device allocation method for each service element.

The terminal device 100 may be a computing device such as a desktop computer, a notebook computer, a palmtop computer, or a cloud server. The terminal device may include but is not limited to the processor 140 and the memory 141. Persons skilled in the art may understand that FIG. 10 is merely an example of the terminal device 100, and does not constitute a limitation on the terminal device 100. The terminal device 100 may include more or fewer components than those shown in the figure, or combine some components, or different components. For example, the terminal device 100 may further include an input/output device, a network access device, or the like.

The processor 140 may be a central processing unit (Central Processing Unit, CPU). The processor 140 may alternatively be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or transistor logic device, a discrete hardware component, or the like. The general-purpose processor may be a microprocessor, or the processor may be any conventional processor or the like.

In some embodiments, the memory 141 may be an internal storage unit of the terminal device 100, for example, a hard disk or a memory of the terminal device 100. In some other embodiments, the memory 141 may also be an external storage device of the terminal device 100, for example, a plug-in hard disk, a smart media card (Smart Media Card, SMC), a secure digital (Secure Digital, SD) card, or a flash card (Flash Card) that is provided on the terminal device 100. Further, the memory 141 may include both the internal storage unit and the external storage device that are of the terminal device 100. The memory 141 is configured to store an operating system, an application, a boot loader (Boot Loader), data, another program, and the like, for example, program code of the computer program. The memory 141 may further be configured to temporarily store output data or to-be-output data.

It should be noted that content such as information exchange between the foregoing apparatuses/units and the execution processes thereof is based on a same concept as the method embodiments of this application. For specific functions and technical effects of the content, refer to the method embodiments. Details are not described herein again.

It may be clearly understood by persons skilled in the art that, for the purpose of convenient and brief description, division of the foregoing function units and modules is used as an example for illustration. In actual application, the foregoing functions can be allocated to different function units and modules for implementation based on a requirement, that is, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this application. For a specific working process of the units and modules in the foregoing system, refer to a corresponding process in the foregoing method embodiments. Details are not repeatedly described herein.

An embodiment of this application further provides a computer-readable storage medium, where the computer-readable storage medium stores a computer program, and when the computer program is executed by a processor, the steps in the foregoing cross-device allocation method for the service element can be implemented.

An embodiment of this application provides a computer program product. When the computer program product runs on a mobile terminal, the mobile terminal is enabled to perform the steps in the foregoing cross-device allocation method for the service element.

When the integrated unit is implemented in the form of the software functional unit and sold or used as an independent product, the integrated unit may be stored in a computer-readable storage medium. Based on such an understanding, all or some of the processes of the method in embodiments of this application may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable medium may include at least any entity or apparatus that can carry computer program code to a photographing apparatus/terminal device, a recording medium, a computer memory, a read-only memory (ROM, Read-Only Memory), a random access memory (RAM, Random Access Memory), an electrical carrier signal, a telecommunications signal, and a software distribution medium, for example, a USB flash drive, a removable hard disk, a magnetic disk, or an optical disk. In some jurisdictions, the computer-readable medium cannot be the electrical carrier signal or the telecommunications signal according to legislation and patent practices.

In the foregoing embodiments, the description of each embodiment has respective focuses. For a part that is not described in detail or recorded in an embodiment, refer to related descriptions in other embodiments.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

In embodiments provided in this application, it should be understood that the disclosed apparatus/network device and method may be implemented in other manners. For example, the described apparatus/network device embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
    obtaining, from a source device, at least one service element;
    determining a preset matching relationship between each of the at least one service element and each of a plurality of target allocation devices, wherein the preset matching relationship describes a probability value that each of the at least one service element is allocated to each of the target allocation devices, wherein determining the preset matching relationship comprises obtaining a first matching relationship, corresponding to a target user type of a target user that currently uses the source device, between each of the at least one service element and each of the target allocation devices, and wherein obtaining the first matching relationship comprises:
    obtaining, from an element attribute matrix, a first score value, corresponding to the target user type, of each of the at least one service element relative to each preset element attribute;
    obtaining, from a device attribute matrix, a second score value, corresponding to the target user type, of each of the target allocation devices relative to each preset device attribute; and
    further obtaining, based on the first score value and the second score value, the first matching relationship by performing a multiplication operation on the element attribute matrix and the device attribute matrix to obtain a first matching matrix indicating the first matching relationship;
    obtaining a second matching relationship, based on an allocation operation from the target user on the at least one service element, between each of the at least one service element and each of the target allocation devices;
    determining, according to the first matching relationship and the second matching relationship and using a preset linear programming equation, the first correspondence, wherein the preset linear programming equation comprises:

$$\text{Max} \Sigma_{i,j=1}^{q,m} w_1 UX + w_2 PX + w_3 DX, \text{ wherein}$$

$n_i = \Sigma_{k=1}^{m} x_{i,k}$, wherein $w_1$ is a first preset weight of the first matching relationship, wherein $w_2$ is a second preset weight of the second matching relationship, wherein $w_3$ is a third preset weight of the first distance relationship, wherein $w_1 + w_2 + w_3 = 1$, wherein $w_3 \neq 0$, wherein q is a quantity of the at least one service element, wherein m is a quantity of the target allocation devices, wherein U is the first matching relationship, wherein $U = \{u_{i,j}\}$, wherein $u_{i,j}$ is a first probability value that an $i^{th}$ service element is allocated to a $j^{th}$ target allocation device, wherein $i = 1, 2 \ldots$, and q, wherein $j = 1, 2 \ldots$, and m, wherein P is the second matching relationship, wherein $P = \{p_{i,j}\}$, wherein $p_{i,j}$ is a second probability value that the $i^{th}$ service element is allocated to the $j^{th}$ target allocation device, wherein D is the first distance relationship, wherein $D = \{d_j\}$, wherein $d_j$ is a distance value between the $j^{th}$ target allocation device and the source device, wherein X is the first correspondence, wherein $X = \{x_{i,j}\}$, wherein $x_{i,j}$ indicates whether the $i^{th}$ service element is to be allocated to the $j^{th}$ target allocation device, wherein a value of $x_{i,j}$ is one or zero, wherein the $i^{th}$ service element is to be allocated to the $j^{th}$ target allocation device when the value of $x_{i,j}$ is one, wherein the $i^{th}$ service element is not to be allocated to the $j^{th}$ target allocation device when the value of $x_{i,j}$ is zero, and wherein $n_i$ is a quantity of target allocation devices to which the $i^{th}$ service element can be allocated;
    obtaining a first distance relationship between each of the target allocation devices and the source device;
    determining, according to the preset matching relationship and the first distance relationship, a first correspondence between each of the at least one service element and each of the target allocation devices; and
    allocating, according to the first correspondence, each of the at least one service element to a corresponding target allocation device.

2. The method of claim 1, wherein before obtaining the at least one service element and determining the preset matching relationship, the method further comprises:
    obtaining a first distance value between each of a plurality of first candidate devices and the source device, wherein each of the first candidate devices is a terminal device located in a same network as the source device; and
    setting, as the corresponding target allocation device, a second candidate device of the first candidate devices, wherein the second candidate device comprises a second distance value that is between the second candidate device and the source device and that is less than or equal to a preset distance threshold.

3. The method of claim 1, wherein the corresponding target allocation device does not comprise a preset wearable device, and wherein after allocating each of the at least one service element to the corresponding target allocation device, the method further comprises:
    obtaining motion data of the source device in real time;
    detecting, based on the motion data, that a location of the source device has changed;

obtaining, in response to the detecting, a second distance relationship;
determining, according to the preset matching relationship and the second distance relationship, a second correspondence; and
further allocating, according to the second correspondence, each of the at least one service element to the corresponding target allocation device.

4. The method of claim 1, wherein the corresponding target allocation device comprises a preset wearable device, and wherein after allocating each of the at least one service element to the corresponding target allocation device, the method further comprises:
obtaining first motion data of the source device in real time;
obtaining second motion data of the preset wearable device in the real time;
detecting, based on the second motion data, that a location of the preset wearable device has changed and detecting that a user currently using the preset wearable device is a target user;
obtaining, in response to detecting that the location has changed and detecting that the user is the target user, a second distance relationship between each of the target allocation devices and the preset wearable device;
determining, according to the preset matching relationship and the second distance relationship, a second correspondence; and
further allocating, according to the second correspondence, each of the at least one service element to the corresponding target allocation device.

5. The method of claim 1, wherein after allocating each of the at least one service element to the corresponding target allocation device, the method further comprises:
receiving, from the target user, an allocation result adjustment instruction;
allocating, in response to the allocation result adjustment instruction, a service element indicated by the allocation result adjustment instruction to a target allocation device indicated by the allocation result adjustment instruction; and
updating, in response to the allocation result adjustment instruction, the second matching relationship.

6. A terminal device comprising:
a memory configured to store instructions; and
a processor coupled to the memory, wherein the instructions cause the processor to be configured to:
obtain, from the terminal device, at least one service element; determine a preset matching relationship between each of the at least one service element and each of a plurality of target allocation devices, wherein the preset matching relationship describes a probability value that each of the at least one service element is allocated to each of the target allocation devices, wherein to determine the preset matching relationship, the instructions further cause the processor to be configured to obtain a first matching relationship, corresponding to a target user type of a target user that currently uses the terminal device, between each of the at least one service element and each of the target allocation devices, and wherein to obtain the first matching relationship, the instructions further cause the processor to be configured to:
obtain, from an element attribute matrix, a first score value, corresponding to the target user type, of each of the at least one service element relative to each preset element attribute;
obtain, from a device attribute matrix, a second score value, corresponding to the target user type, of each of the target allocation devices relative to each preset device attribute; and
further obtain, based on the first score value and the second score value, the first matching relationship by performing a multiplication operation on the element attribute matrix and the device attribute matrix to obtain a first matching matrix indicating the first matching relationship;
obtain a second matching relationship, based on an allocation operation from the target user on the at least one service element, between each of the at least one service element and each of the target allocation devices;
determine, according to the first matching relationship and the second matching relationship and using a preset linear programming equation, the first correspondence, wherein the preset linear programming equation comprises:

$$Max \Sigma^{q,m}_{i,j=1} w_1 UX + w_2 PX + w_3 DX,$$

wherein $n_i = \Sigma^m_{k=1} x_{i,k}$, wherein $w_1$ is a first preset weight of the first matching relationship, wherein $w_2$ is a second preset weight of the second matching relationship, wherein $W_3$ is a third preset weight of the first distance relationship, wherein $w_1 + w_2 + W_3 = 1$, wherein $W_3 \neq 0$, wherein q is a quantity of the at least one service element, wherein m is a quantity of the target allocation devices, wherein U is the first matching relationship, wherein $U = \{u_{i,j}\}$, wherein $u_{i,j}$ is a first probability value that an $i^{th}$ service element is allocated to a $j^{th}$ target allocation device, wherein i=1, 2, ..., and q, wherein j=1, 2, ..., and m, wherein P is the second matching relationship, wherein $P = \{P_{i,j}\}$, wherein $P_{i,j}$ is a second probability value that the $i^{th}$ service element is allocated to the $j^{th}$ target allocation device, wherein D is the first distance relationship, wherein $D = \{d_j\}$, wherein $d_j$ is a distance value between the $j^{th}$ target allocation device and the source device, wherein X is the first correspondence, wherein $X = \{x_{i,j}\}$, wherein $x_{i,j}$ indicates whether the $i^{th}$ service element is to be allocated to the $j^{th}$ target allocation device, wherein a value of $x_{i,j}$ is one or zero, wherein the $i^{th}$ service element is to be allocated to the $j^{th}$ target allocation device when the value of $x_{i,j}$ is one, wherein the $i^{th}$ service element is not to be allocated to the $j^{th}$ target allocation device when the value of $x_{i,j}$ is zero, and wherein $n_i$ is a quantity of target allocation devices to which the $i^{th}$ service element can be allocated;
obtain a first distance relationship between each of the target allocation devices and the terminal device;
determine, according to the preset matching relationship and the first distance relationship, a first correspondence between each of the at least one service element and each of the target allocation devices; and
allocate, according to the first correspondence, each of the at least one service element to a corresponding target allocation device.

7. The terminal device of claim 6, wherein before obtaining the at least one service element and determining the preset matching relationship, the instructions further cause the processor to be configured to:
obtain a first distance value between each of a plurality of first candidate devices and the terminal device, wherein each of the first candidate devices is a terminal device located in a same network as the terminal device; and set, as the corresponding target allocation device, a second candidate device of the first candidate devices, wherein the second candidate device comprises a second distance value that is between the second candidate device and the terminal device and that is less than or equal to a preset distance threshold.

8. The terminal device of claim 6, wherein the corresponding target allocation device does not comprise a preset wearable device, wherein after allocating each of the at least one service element to the corresponding target allocation device, the instructions further cause the processor to be configured to:
  obtain motion data of the terminal device in real time;
  detect, based on the motion data, that a location of the terminal device has changed;
  obtain, in response to the detecting, a second distance relationship;
  determine, according to the preset matching relationship and the second distance relationship, a second correspondence; and
  further allocate, according to the second correspondence, each of the at least one service element to the corresponding target allocation device.

9. The terminal device of claim 6, wherein the target allocation device comprises a preset wearable device, and wherein after allocating each of the at least one service element to the corresponding target allocation device, the instructions further cause the processor to be configured to:
  obtain first motion data of the terminal device in real time;
  obtain second motion data of the preset wearable device in the real time;
  detect, based on the second motion data, that a location of the preset wearable device has changed and detecting that a user currently using the preset wearable device is a target user;
  obtain, in response to detecting that the location has changed and detecting that the user is the target user, a second distance relationship between each of the target allocation devices and the preset wearable device;
  determine, according to the preset matching relationship and the second distance relationship, a second correspondence; and
  further allocate, according to the second correspondence, each of the at least one service element to the corresponding target allocation device.

10. The terminal device of claim 6, wherein after allocating the each of the at least one service element to the corresponding target allocation device, the instructions further cause the processor to be configured to:
  receive, from a target user, an allocation result adjustment instruction;
  allocate, in response to the allocation result adjustment instruction, a service element indicated by the allocation result adjustment instruction to a target allocation device indicated by the allocation result adjustment instruction; and
  update, in response to the allocation result adjustment instruction, the second matching relationship.

11. A computer program product comprising computer-executable instructions that are stored on a non-transitory computer readable medium and that, when executed by a processor, cause a terminal device to:
  obtain, from the terminal device, at least one service element;
  determine a preset matching relationship between each of the at least one service element and each of a plurality of target allocation devices, wherein the preset matching relationship describes a probability value that each of the at least one service element is allocated to each of the target allocation devices, wherein to determine the preset matching relationship, the computer-executable instructions further cause the terminal device to obtain a first matching relationship, corresponding to a target user type of a target user that currently uses the terminal device, between each of the at least one service element and each of the target allocation devices, and wherein to obtain the first matching relationship, the computer-executable instructions further cause the terminal device to:
  obtain, from an element attribute matrix, a first score value, corresponding to the target user type, of each of the at least one service element relative to each preset element attribute;
  obtain, from a device attribute matrix, a second score value, corresponding to the target user type, of each of the target allocation devices relative to each preset device attribute; and
  further obtain, based on the first score value and the second score value, the first matching relationship by performing a multiplication operation on the element attribute matrix and the device attribute matrix to obtain a first matching matrix indicating the first matching relationship;
  obtain a second matching relationship, based on an allocation operation from the target user on the at least one service element, between each of the at least one service element and each of the target allocation devices;
  determine, according to the first matching relationship and the second matching relationship and using a preset linear programming equation, the first correspondence, wherein the preset linear programming equation comprises:

$$\text{Max} \Sigma_{i,j=1}^{q} , m w_1 UX + w_2 PX + w_3 DX, \text{ wherein}$$

$n_i = \Sigma_{k=1}^{m} x_{i,k}$, wherein $w_1$ is a first preset weight of the first matching relationship, wherein $w_2$ is a second preset weight of the second matching relationship, wherein $w_3$ is a third preset weight of the first distance relationship, wherein $w_1 + w_2 + w_3 = 1$, wherein $w_3 \neq 0$, wherein q is a quantity of the at least one service element, wherein m is a quantity of the target allocation devices, wherein U is the first matching relationship, wherein $U = \{u_{i,j}\}$, wherein $u_{i,j}$ is a first probability value that an $i^{th}$ service element is allocated to a $j^{th}$ target allocation device, wherein $i=1, 2, \ldots$ and q, wherein $j=1, 2 \ldots$, and m, wherein P is the second matching relationship, wherein $P = \{p_{i,j}\}$, wherein $p_{i,j}$ is a second probability value that the $i^{th}$ service element is allocated to the $j^{th}$ target allocation device, wherein D is the first distance relationship, wherein $D = \{d_j\}$, wherein $d_j$ is a distance value between the $j^{th}$ target allocation device and the source device, wherein X is the first correspondence, wherein $X = \{x_{i,j}\}$, wherein $x_{i,j}$ indicates whether the $i^{th}$ service element is to be allocated to the $j^{th}$ target allocation device, wherein a value of $x_{i,j}$ is one or zero, wherein the $i^{th}$ service element is to be allocated to the $j^{th}$ target allocation device when the value of $x_{i,j}$ is one, wherein the $i^{th}$ service element is not to be allocated to the $j^{th}$ target allocation device when the value of $x_{i,j}$ is zero, and wherein $n_i$ is a quantity of target allocation devices to which the $i^{th}$ service element can be allocated;

obtain a first distance relationship between each of the target allocation devices and the terminal device; determine, according to the preset matching relationship and the first distance relationship, a first correspondence between each of the at least one service element and each of the target allocation devices; and allocate, according to the first correspondence, each of the at least one service element to a corresponding target allocation device.

12. The computer program product of claim 11, wherein before obtaining the at least one service element and determining the preset matching relationship, the computer-executable instructions further cause the terminal device to:

obtain a first distance value between each of a plurality of first candidate devices and the terminal device, wherein each of the first candidate devices is a terminal device located in a same network as the terminal device; and set, as the corresponding target allocation device, a second candidate device of the first candidate devices, wherein the second candidate device comprises a second distance value that is between the second candidate device and the terminal device and that is less than or equal to a preset distance threshold.

13. The computer program product of claim 11, wherein the corresponding target allocation device does not comprise a preset wearable device, and wherein the computer-executable instructions further cause the terminal device to:

obtain motion data of the terminal device in real time;

detect, based on the motion data, that a location of the terminal device has changed;

obtain, in response to the detecting, a second distance relationship;

determine, according to the preset matching relationship and the second distance relationship, a second correspondence; and further allocate, according to the second correspondence, each of the at least one service element to the corresponding target allocation device.

14. The computer program product of claim 11, wherein the corresponding target allocation device comprises a preset wearable device, and wherein the computer-executable instructions further cause the terminal device to:

obtain first motion data of the terminal device in real time;

obtain second motion data of the preset wearable device in the real time;

detect, based on the second motion data, that a location of the preset wearable device has changed and detecting that a user currently using the preset wearable device is a target user;

obtain, in response to detecting that the location has changed and detecting that the user is the target user, a second distance relationship between each of the target allocation devices and the preset wearable device;

determine, according to the preset matching relationship and the second distance relationship, a second correspondence; and further allocate, according to the second correspondence, each of the at least one service element to the corresponding target allocation device.

15. The computer program product of claim 11, wherein after allocating each of the at least one service element to the corresponding target allocation device, the computer-executable instructions further cause the terminal device to:

receive, from the target user, an allocation result adjustment instruction;

allocate, in response to the allocation result adjustment instruction, a service element indicated by the allocation result adjustment instruction to a target allocation device indicated by the allocation result adjustment instruction; and update, in response to the allocation result adjustment instruction, the second matching relationship.

\* \* \* \* \*

UNITED STATES PATENT AND TRADEMARK OFFICE
CERTIFICATE OF CORRECTION

PATENT NO. : 12,132,793 B2
APPLICATION NO. : 17/802014
DATED : October 29, 2024
INVENTOR(S) : Xiaohui Ma and Chundong Li It is certified that error appears in the above-identified patent and that said Letters Patent is hereby corrected as shown below:

In the Claims

Claim 1, Column 40, Line 5: "Max∑.sub.*i,j*=1.sup.*q,m*w.sub1*UX*+w.sub.2*PX*+w.sub.3*DX*, wherein" should read "$Max \sum_{i,j=1}^{q,m} w_1 UX + w_2 PX + w_3 DX$, wherein"

Claim 1, Column 40, Line 8: "n.sub.i=∑.sub.k=1.supmx.subi,k, wherein" should read "$n_i = \sum_{k=1}^{m} x_{i,k}$,"

Claim 1, Column 40, Line 19: "2 . . . , and q" should read "2, . . . , and q"

Claim 1, Column 40, Line 19: "j=1,2 . . . , and m" should read "j=1,2, . . . , and m"

Claim 6, Column 42, Line 26: "wherein $W_3$ is a third" should read "wherein $w_3$ is a third"

Claim 6, Column 42, Line 27: "$W_3 \neq 0$" should read "$w_3 \neq 0$"

Claim 11, Column 44, Line 40: "Max∑.sub.*i,j*=1.sup.*q,m*w.sub1*UX*+w.sub.2*PX*+w.sub.3*DX*, wherein" should read "$Max \sum_{i,j=1}^{q,m} w_1 UX + w_2 PX + w_3 DX$, wherein"

Claim 11, Column 44, Line 41: "n.sub.i=∑.sub.k=1.supmx.subi,k, wherein" should read "$n_i = \sum_{k=1}^{m} x_{i,k}$,"

Claim 11, Column 44, Line 53: "2 . . . , and q" should read "2, . . . , and q"

Signed and Sealed this
Twenty-fourth Day of December, 2024

Derrick Brent
*Acting Director of the United States Patent and Trademark Office*

CERTIFICATE OF CORRECTION (continued)
U.S. Pat. No. 12,132,793 B2

Claim 11, Column 44, Line 53: "j=1,2 . . . , and m" should read "j=1,2, . . . , and m"

Claim 25, Column 42, Line 67: "component, or" should read "component; or"

Claim 25, Column 43, Line 3: "component, or" should read "component; or"